United States Patent
Gardiner et al.

(10) Patent No.: US 11,543,250 B2
(45) Date of Patent: *Jan. 3, 2023

(54) SECURITIZED AND ENCRYPTED DATA FOR VEHICLE SERVICE SCHEDULING AND DISPATCH DEVICES (SSDD) AND SYSTEMS THAT PROVIDE IMPROVED OPERATIONS AND OUTCOMES

(71) Applicants: Diarmuid Gardiner, Quincy, MA (US); Bartosz Czerwinski, Wroclaw (PL)

(72) Inventors: Diarmuid Gardiner, Quincy, MA (US); Bartosz Czerwinski, Wroclaw (PL)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,676

(22) Filed: May 2, 2022

(65) Prior Publication Data

US 2022/0252411 A1 Aug. 11, 2022

Related U.S. Application Data

(63) Continuation-in-part of application No. 16/824,477, filed on Mar. 19, 2020.
(Continued)

(51) Int. Cl.
*G01C 21/34* (2006.01)
*G06Q 50/00* (2012.01)
(Continued)

(52) U.S. Cl.
CPC ..... *G01C 21/3438* (2013.01); *G01C 21/3461* (2013.01); *G01C 21/3484* (2013.01);
(Continued)

(58) Field of Classification Search
CPC ..... G06Q 20/405; G06Q 20/145; G06Q 20/40
See application file for complete search history.

(56) References Cited

U.S. PATENT DOCUMENTS 6,609,050 B2 8/2003 Li
6,668,219 B2 12/2003 Hwang et al.
(Continued)

*Primary Examiner* — Barbara B Anyan
(74) *Attorney, Agent, or Firm* — ePatentManager.com; Guerry L. Grune

(57) ABSTRACT

Computer-based vehicle service scheduling and dispatch devices (SSDD) are operational in connection with access and user devices. The SSDDs communicate with vehicle owners to assess potential vehicle issues and determine, schedule, and individualize details of a vehicle's visit to a dealership. The devices are virtual and/or real and/or physical devices; networked or stand-alone computer terminals, smart- or cell-phones, scanners, printers, etc., capable of transceiving data and data signals and receiving, storing, retrieving, and analyzing data obtained directly from data transmitted to and from the vehicle.

Some SSDDs are provided for two separate customer types; a subscription customer or an inquiry customer. The subscription customer has subscribed permission to utilize already connected vehicles so that automatic transmission of vehicle data such as type, age, and mileage is accessed for an intelligent engine that provides specially selected inquiry menus of service and vehicular analysis little or no vehicle owner's input is required.

21 Claims, 15 Drawing Sheets

Related U.S. Application Data

(60) Provisional application No. 62/820,690, filed on Mar. 19, 2019.

(51) Int. Cl.
*G06Q 20/40* (2012.01)
*G06Q 10/02* (2012.01)

(52) U.S. Cl.
CPC ....... *G01C 21/3492* (2013.01); *G06Q 10/025* (2013.01); *G06Q 20/405* (2013.01); *G06Q 50/01* (2013.01)

(56) References Cited

U.S. PATENT DOCUMENTS

| | | | |
|---|---|---|---|
| 10,154,015 B1 | 12/2018 | Lerner | |
| 10,154,016 B1 | 12/2018 | Lerner | |
| 10,154,021 B1 | 12/2018 | Lerner | |
| 10,154,031 B1 | 12/2018 | Lerner | |
| 10,158,613 B1 | 12/2018 | Lerner | |
| 10,171,435 B1 | 1/2019 | Lerner | |
| 10,171,444 B1 | 1/2019 | Lerner | |
| 10,977,881 B1 * | 4/2021 | Buentello | G06Q 20/405 |
| 2002/0029101 A1 * | 3/2002 | Larson | G07C 5/008 |
| | | | 709/217 |
| 2004/0073434 A1 | 4/2004 | Volquardsen et al. | |
| 2014/0278608 A1 * | 9/2014 | Johnson | B60R 25/24 |
| | | | 705/5 |
| 2014/0334653 A1 | 11/2014 | Luna et al. | |
| 2015/0030998 A1 * | 1/2015 | Liu | G09B 19/167 |
| | | | 434/62 |
| 2017/0352011 A1 | 12/2017 | Sells et al. | |
| 2018/0293603 A1 * | 10/2018 | Glazier | G06Q 50/01 |
| 2020/0210906 A1 * | 7/2020 | Rice | G06Q 10/025 |
| 2020/0339142 A1 * | 10/2020 | Aggarwal | G06F 21/34 |

* cited by examiner

SECURITIZED AND ENCRYPTED DATA FOR VEHICLE SERVICE SCHEDULING AND DISPATCH DEVICES (SSDD) AND SYSTEMS THAT PROVIDE IMPROVED OPERATIONS AND OUTCOMES

PRIORITY

This application is continuation-in-part of and claims priority under 35 USC 120 from Nonprovisional application Ser. No. 16/824,477 filed Mar. 19, 2020, which is a continuation of and claims priority under 35 USC 119 from Provisional Application No. 62/820,690, both entitled "Securitized And Encrypted Data For Vehicle Service Concierge (SC) Devices And Systems That Provide And Predict Improved Operations And Outcomes" filed Mar. 19, 2019.

All published applications cited above are also hereby incorporated by reference in their entirety.

FIELD OF INVENTION

The present disclosure relates generally to devices and/or systems that enable and provide automation of predictive estimates and reports associated with all known and anticipated needs, costs, and pricing of servicing vehicles as well as automation of service appointment generation, assessment of required services and assignment of tasks to provide service by service associates or other employees within a dealership/vehicle service organization. These tasks are achieved by a combination of hardware, software, databases and advanced machine learning algorithms that support artificial intelligence (AI) to provide service organizations with the capabilities to address both current and future aspects of care, maintenance, predictive needs, and potential upgrades not previously available to owners of automobiles, trucks, and other transportation vehicles. More particularly, the present disclosure relates to utilizing computers and computer-networked devices with databases and systems that provide vehicle organizations with the capability to predict revenue streams based on the use of constantly updated information in order to optimize efficiency and profitability. This disclosure also includes details which address the fact that as autonomous/driverless vehicles become more commonplace, the need for human interaction will dwindle giving rise to vehicles that are self-maintaining as well as self-driving. It is also important to have the ability to securitize and encrypt the customer and vehicle informational data transmitted to and from numerous dealership Service Scheduling and Dispatch Devices (SSDD) and associated systems.

DISCUSSION OF RELATED ART

In the field of automotive servicing, consumers purchase either new or used vehicles that may or may not have a warranty.

While automotive sales are obviously important to automobile dealerships, servicing also represents a substantial portion of their business. As such, vehicle dealerships have servicing departments which handle high volumes and therefore also are faced with a heavy workload.

During a typical servicing write-up, a customer will arrive at a dealership either with or without an appointment and request "on the spot" attention. The service advisor or others at the dealership will make a brief determination of the necessary parts and labor needed to complete the repair. It is important to note that this vehicle write-up must be completed quickly in order for the servicing department to effectively handle a high volume of repairs. Thus, there is little time to perform an effective preliminary diagnosis, and underlying problems often appear after the repair process has begun and an estimate has been given. Another difficulty is that few resources exist that can aid in vehicle-specific diagnosis when determining servicing requirements. High employee turnover also typically exists at the service advisor position, which creates additional resource and scheduling difficulties (for the dealership or vehicle servicing organization).

Normally, a service advisor at a dealership/organization performs a repair estimate, creates an initial repair order, dispatches the work to a service technician, schedules the service and monitors the progress of repair. The service associate also communicates the progress of repair back to the customer and serves as a point of contact. In the present disclosure, the service associate can be either a service technician or a service advisor or function as both. It is also possible that the dealership service will use telephone operators, receptionists, etc., involved in the booking of a vehicle for the dealership. Upon completion of the servicing, the service associate performs additional tasks to explain the services performed and supervises the return of the vehicle to the owner. Arranging the departure of a customer once the customer is ready to leave the vehicle for repair demands significant effort from the service advisor. Specifically, a service advisor has to contact loaner vehicle management systems, rental vehicle options, taxi and uber-like businesses, etc., to arrange outbound travel for the consumer/customer/user. Loaner vehicle dispatch system demands a "Know Your Customer" (KYC) procedure which involves customer identification with physical and/or digital documents. These resources are resource intensive regarding the time spent by service advisors and other dealership employees. For the purposes of this disclosure, customers, consumers, and users of the SSDD (virtual and/or real and/or physical) are often interchangeable as one or more persons are advantaged by the use of the SSDD. The SSDD devices and systems have the ability to automate the functions associated with these tasks.

One shortcoming of these approaches includes the write-up process and the need for effective pre-diagnosis. The write-up process is a process which has historically included human interaction with vehicle owners and those involved in all aspects of servicing the vehicle and their owners). Specifically, the collection of service information such as symptoms associated with the vehicle's performance, appearance, etc., customer identification and vehicle identification is performed manually and under substantial time constraints. Furthermore, the analysis of the service information is typically cursory. Additionally, other short comings of current business methods include the need for manual labor required in booking (scheduling) a vehicle for inspection and/or service. The SSDD has the ability to automate the functions associated with these tasks using artificial intelligence (AI) systems together with custom hardware, software and dynamic databases that can be continuously updated.

Of further concern and what has not been previously addressed is the need for owners and operators of the dealership/organization to reliably, consistently, and reproducibly predict the workloads and associated costs of servicing multiple vehicles on (normally) an irregular basis. In order to efficiently and economically operate the dealership while also producing regular and reproducible quality service, an additional need exists to employ devices and systems that will provide real time capabilities to predict and monitor costs, profitability, and associated services required on a per vehicle/owner basis. Furthermore, to be economically viable, the SSDD ecosystem of devices and systems must be able to automate scheduling of vehicles which also reduces human labor workload(s).

The present disclosure overcomes the aforementioned disadvantages as well as other disadvantages described below in further detail.

SUMMARY

In accordance with the teachings of the present disclosure one or more computer-based devices and/or systems are provided that collect information in the form of data or data sets regarding a vehicle from a user that must provide at least a VIN (vehicle identification number) as well as a customer/consumer identification code (CIC). The CIC can be a phone number, email id, instant messenger id, or other desired identification of the customer/consumer needed to complete transactions in a business environment. Devices typically used for both the VIN and CIC number identifiers include scanner, sensors, as well as APIs with manual and/or voice or and/or biometric computer inputs. One major purpose of the Service Scheduling and Dispatch Device that can includes predictor device(s) the CSSDD, is to determine, schedule, detail, and individualize real-time and future visits for a vehicle that either abruptly (i.e. in an unscheduled manner) enters the dealers' workshop or have been scheduled (or "booked") for service. In addition, the CSSDD includes use of a scheduling software and can also include a kiosk for customer/consumer interaction, and provides the ability for the customer to have transportation while the vehicle is being serviced. A CSSDD predictor is also capable of accurate and precise prediction of required items that are useful for optimizing business operations at a dealership during servicing of a vehicle by utilizing acquired data that includes at least the following items;

a) Non-essential items that will be recommended and sold for/while servicing the vehicle
b) Which, what and how items will be sold during the servicing
c) The level of expertise of the technician that will be required
d) The essential equipment that will be required
e) The essential and non-essential parts stock requirements
f) Hours required to perform selected services by the technician
g) The total number of hours the vehicle will reside in the vehicle bay/workshop of the dealership
h) The final repair order value—which is the cost to the consumer
i) Prediction and optimization of the utilization/need of/for loaner vehicles
j) Based on time and mileage, maintenance items that will be sold
k) Which staff member of the dealership/organization should interact with the customer and a list of these staff members which can be automatically updated.

Many known predictive systems can provide predictions utilizing quantitative data. In the present disclosure, the CSSDD automated service scheduling system provides unique functionalities compared with current state-of-the-art systems that includes; interaction with a consumer of a vehicle to obtain details of the needs of the consumer using text, voice, and/or data either singularly or in any combination. The CSSDD can automatically understand and interpret the major issues of concern for the consumer regarding the vehicle based on the consumer's description of the problem. Issues of concern are further used to ask the least number of questions to zero-in on the most probable problems in the vehicle. For the purposes of this disclosure, non-essential items include those that are not required to keep the vehicle on the road and drivable. Drivable, in this instance means that the vehicle also meets all the safety requirements for the jurisdiction where the vehicle is registered anywhere in the world (both inside and outside the United States). Keeping the vehicle drivable and/or usable constitutes providing the parts, service, labor, etc. that is required but does not include non-essential parts and service unless the customer/vehicle owner has requested this option.

In the case where predictive capabilities are desired the use of the generated data from databases created are listed in at least (a-j) above, the devices and associated system will provide business intelligence in the form of predictive reports that at least predict and can provide plots with reports that have the capability to detail at least the following;

1. Current/future shop revenues
2. Current/future shop efficiency
3. Current/future staffing needs
4. Current/future bay needs
5. Define and predict most efficient process models
6. Current/future averages regarding all vehicle's make/model/year and associated repair order values
7. Current/future parts inventory requirements
8. The number of service vehicles to be traded in and upgraded
9. The appropriate time to present the customer with an offer for trade-in
10. Real time prediction of the mood of the consumer (state of mind at any instance of time) that allows for prediction of the probability of an upsell option for the vehicle The databases should be protected via securitization and/or encryption and can be dynamically changing databases that accumulate and sort data as needed to provide artificial intelligence to the Carmen Service Scheduling and Dispatch Device devices. These devices are a unique combination of the use of hardware (including automobile dashboards and possibly kiosks) and software (including built-in digital voice assistants, voice assistant in the dashboard, web sites with pages to collect detailed customer and vehicle information software capabilities, etc.) that assist with building and deployment of an accurate predictive business intelligence system with accuracy that is greater than from those predictive systems which do not have access to the set of complete rich and unique data including associated systems that are a portion of the CSSDD. The predictor devices, in the present disclosure include requirements that make it impossible to obtain the predictions associated with the predictor devices and the CSSDD system without the use of computers and/or computer networks. The CSSDD devices can operate as either stand-alone devices, interconnected (via the world wide web or internet, intranet, or cloud) devices, and/or mobile devices. Predictive analytics can be performed on the cloud with computational infrastructures supporting the cloud and using predictive analytic with software that is operational with associated hardware so that virtual and/or real and/or physical devices can perform the necessary operations. The predictor devices can be installed within dealerships or other businesses on stand alone or networked terminals, personal computers, laptops, etc., within the vehicles (in dashboards, consoles, etc.) or simply installed as mobile apps (applications) on smart phones. Accessing the predictions of the predictor devices must be simple, reliable, and reproducible and the predictions should be easily reported to those in need of the prediction outputs. The predictive business intelligence is targeted primarily to senior managers and corporate level executives in dealerships/businesses and is useful for all transportation vehicles including boats, ships, aerospace, military, and those intended for space travel and exploration. Other versions of the more generic SSDD systems are included that can be utilized with existing systems such as SAP, Zoho, CRM (customer relations management), Google, Apple, and Amazon voice activated assistants including Alexa, Echo, Dealership Management Systems etc. as well as other Business Intelligence (BI) software platforms required by each dealership/business. The SSDD system has been developed so that adoption to and with each of the BI platforms is possible and easily accommodated.

Further objects, features and advantages of the present disclosure and associated invention will become apparent from a consideration of the following description and the appended claims when taken in connection with the accompanying drawings.

More specifically the present disclosure includes;

one or more access and user devices comprising: at least one computer processing unit (CPU) with computational capabilities that is connected to and controls a computer memory via an address bus and a data bus where the address bus accesses a designated range of computer memories and range of memory bits and the data bus provides a flow of transmission(s) of data into and out of the CPU and computer memory; so that one or more computer-based vehicle service scheduling and dispatch devices (SSDD)s are operational in connection with or separately from the access and user devices, the SSDD devices comprising; an ability to communicate with a vehicle owner, obtain a description of an owner's concern regarding a vehicle, assess potential mechanical, electrical, optical, and data communication items that might exist for each vehicle, determine, schedule, individualize, and match each detail of a vehicle visit to any vehicle associated business so that when the vehicle enters a workshop the vehicle associated business is prepared to act on items that require attention prior to entrance to the workshop, wherein the SSDDs are employed to provide analysis that includes prediction and monitorization of services and associated costs required for each vehicle and fleet of vehicles or each vehicle or fleet of vehicles on a per vehicle basis and that also includes provision of a determined time increment required for completion of the services.

Here, the SSDDs provide information in a form of data via one or more data streams and act to control one or more output devices, wherein the output devices are computing devices, wherein databases store data and configure bi-directional securitized and/or encrypted transmission of data to and from multiple SSDDs, wherein the user devices, the access devices, and the SSDDs are computing devices, and wherein one or more user, access, and SSDDs store and provide at least partial copies of portions of a master database, and wherein the master database can also include partial databases and each of the databases are linked and communicate with each other and wherein the user, access and/or SSDDs devices include one or more logging and monitoring databases that include statistical and numerical calculations utilizing the data and the transmission of data.

Also, the one or more SSDD devices authenticate using a first set of computing operations, and validate using a second set of computing operations, and wherein a third set of computing operations controls access for a specified set of users of the SSDDs and wherein data associated with the operations is securitized or encrypted or securitized and encrypted.

In addition, the SSDDs provide information in data format that optimizes performance and profitability for the vehicle associated business and wherein the data is accessible in order that the data is produced, analyzed, and interpreted and is optionally contained within a report that summarizes interpretation of the data and wherein the vehicle associated business is a dealership for any vehicle including but not limited to boast, ships, airplanes, rockets, missiles, trains, and electrically driven vehicles.

The SSDS's operate when the vehicle abruptly enters a dealership's workshop in an unscheduled manner or wherein the vehicle is scheduled for future service at the dealership's workshop.

It is also possible that two separate customer types exist as either a subscription customer or an inquiry customer, wherein a subscription customer has subscribed permission to utilize the a Carmen SSDD for connected automobiles such that automatic transmission of vehicle data and provider data includes vehicle type, age, and mileage that is automatically accessed so that an intelligent engine of a Carmen Services Menu Provider provides, via artificial intelligence, a specially selected inquiry menu of services and vehicular analysis so that the subscription customer is provided seamless service in that the seamless service does requires a minimum or none of a vehicle owner's input and wherein the inquiry customer must at a minimum provide data and information to the SSDDs to determine service teams and an actual time required to perform each of necessary and/or selected services via a required services selector.

The predictive assessments provide statistical certainty with regard to vehicular needs based upon historical data obtained from each vehicle and wherein the historical data resides in one or more static or dynamic databases that are included within the one or more computer-based SSDDs.

The databases are located within at least one of a group consisting of; a stand-alone, laptop, or mobile computer, a client-server, a network of computers that are networked individually or together and access an internet, a cellular phone that is a smart phone, and a cloud computer. In a further embodiment the SSD devices access at least one of a group consisting of an internet, intranet, and extranet such that the devices obtain data generated from multiple sources in addition to data obtained from a single or multiple vehicle related businesses and/or dealerships.

In many cases, the data that contains costs, profitability, and associated vehicle services is provided on a per owner basis for individual or fleets of vehicles to vehicle related businesses and dealerships.

The prediction of items required to service the vehicles are selected from at least one of a group consisting of; non-essential items that will be recommended for/while service is performed for the vehicles during servicing, a level of skill of one or more technicians that will be required, essential equipment required, essential and non-essential parts stock requirements, number of labor hours required to perform service (broken down by labor type: customer pay, warranty pay, internal pay etc.). a total number of hours the vehicle(s) will reside in a vehicle bay/workshop of the dealership, a final repair order value that includes a cost to a consumer, and prediction and optimization of utilization and need of and for loaner vehicles, wherein the prediction is based on data attributes including time and mileage, time on roadways, streets, and highways, as well as customer spending habits, number of vehicles owned and maintenance items that will be sold so that how and which one or more staff members of the vehicle related business and/or dealership should interact with an owner of the vehicle.

In another embodiment the use of data from databases created or obtained using the SSDDs provides business intelligence in a form of predictive reports that at least predict and can also provide plots with the reports that provide details from at least one of a group consisting of; current/future shop revenues, current/future shop efficiencies, current/future staffing needs, current/future bay needs, current/future averages regarding all vehicle makes/models/years and associated repair order values, current/future parts inventory requirements, a number of service vehicles to be traded in and upgraded, and an appropriate time to present customers with an offer for trade-in that is dependent on predictions obtained from the SSDDs.

Often the databases are protected via securitization and/or encryption and are dynamically changing databases that can accumulate and sort data as needed to provide artificial intelligence (AI) to the SSDDs.

These SSD devices can be either virtual devices and/or real and/or physical devices.

In yet another embodiment, there are one or more transaction secured computer-based dealership SSDD predictor (SSDD) devices that transmit to and receive data from one or more transaction secured SSDDs to another, comprising: a housing; a computer driven communication processor containing a microprocessor and data storage encryption capacity fixedly mounted in the housing; one or more circuits fixedly mounted in the housing and communicatively coupled with the computer driven communication processor; a power source coupled with the circuits; at least one transceiver including a data transceiver portion coupled with the housing and coupled with the circuits and with the computer driven communication processor where one or more sensors are held within or on one or more surfaces of the transaction secured SSDD devices; wherein the transaction secured SSDDs transmit and receive encrypted signals from one or more the transaction secured SSDDs to another that form specific transmissions determined by one or more users, to the transceiver and a vehicle data transceiver portion of the transceiver;

wherein the transceiver and the vehicle data transceiver portion of the transceiver determines, via authentication and validation, identification of the users and confirms if the users are allowed access and manipulation of the transaction secured SSDDs via utilization of the computer driven communication processor;

wherein the computer driven communication processor provides, processes, and analyzes confirmation and authentication of the users and allows a designated set of users of the SSDD transaction secured devices to operate the SSDD devices.

The SSDD transaction secured devices can have circuits that are connected to sensors or the circuits themselves can function as sensors.

The circuits are selected from the group consisting of; mechanical, electronic, optical, electromechanical, optomechanical and radiation emitting or receiving or both radiation emitting and receiving energized circuits that transmit and receive signals.

In most cases, where there is one or more display portions, they are communicatively coupled with the circuits.

The transaction secured devices also may have display portions that display timepiece data or transaction data or both timepiece data and transaction data.

Here the transaction secured devices are themselves either real and/or physical devices, virtual devices, or both real and/or physical and virtual devices.

In a further embodiment, the transaction secured devices are selected from one or more of a group consisting of; computer terminals, laptop computers, smart phones that are cell phones with computation capabilities, printers, kiosks, vehicular dashboards with computational capabilities and visual or audio or both visual and audio displays, and transceivers with visual or audio or visual and audio information conveyance capabilities.

In yet another embodiment, the SSDDs include one or more Carmen Service Scheduling and Dispatch Device (CSSDD) Predictor AI module(s) that is a software module form automobiles that operates together with and can reside within or external to the SSDD device(s) and that is responsible for provision of descriptive, predictive, and prescriptive business data for vehicle dealerships, associated vehicle businesses, and any stakeholders of the businesses, and wherein the Carmen Service Scheduling and Dispatch Device Predictor AI module provides data that utilizes data stored in Dealership Management Systems DMS and related databases with data derived from dealerships and vehicle associated businesses and generates data using digital communication channels either housed within the SSDD device(s) or data derived from external data and databases.

Here the data is continuously updated data that includes a consumer's description of vehicle problems, concern types detected by a Carmen Service Scheduling and Dispatch Device Understand AI module, and consumer's emotion(s) regarding the vehicle wherein the continuously updated data is continuously improving data in that data capture is useful for data analysis of one or more vehicles and the data analysis is based upon at least consumer interaction with vehicle(s) data and direct from vehicle automated interaction data.

The vehicle interaction data includes customer's vehicle data that is captured by sensors that utilize data sent through digital communication channels including vibration sensors in addition to additional data captured directly from informational data that is contained within vehicles.

For the CSSDD Predictor AI Module it is also possible to include unique consumer interaction data and vehicle interaction data available on SSDDs are transformed by the CSSDD Predictor AI module using techniques that include log transformation and binarizing categorical predictor variables in order to allow the CSSDD Predictor AI module to generate business analytics for the vehicle associated businesses, the business analytics selected from at least one or more of a group consisting of a dealership, a customer/consumer, vehicle repair and maintenance records, and wherein the vehicles include at least one or more of a group consisting of automobiles, trucks, motorcycles, snowmobiles, above and below water transportation craft, aircraft, and spacecraft and wherein the group can also be a fleet of the vehicles.

The SSDD devices are employed to provide at least one of a group consisting of service, repairs, maintenance, and predictive analysis for autonomous or driverless or autonomous and driverless vehicles on a per vehicle basis and includes a time required for accomplishment of the services.

A further embodiment includes the use of one or more access and user systems comprising: at least one computer processing unit (CPU) with computational capabilities that is connected to and controls a computer memory via an address bus and a data bus where the address bus accesses a designated range of computer memories and range of memory bits and the data bus provides a flow of transmission(s) of data into and out of the CPU and computer memory; so that one or more computer-based vehicle SSDD systems are operational in connection with or separately from the access and user devices, the SSDD systems comprising; an ability to communicate with a vehicle owner, obtain a description of an owner's concern regarding a vehicle, assess potential issues that might exist for each vehicle, and to determine, schedule, and individualize each detail of a vehicle visit to any vehicle associated business that enters a workshop, wherein the SSDD systems are employed to provide predictive analysis that includes and predicts or monitors or predicts and monitors services and associated costs required for each vehicle and/or fleet of vehicles on a per vehicle basis and that includes a time required for accomplishment of the services.

Here the SSDDs provide information in a form of data and act to control one or more outputs devices, wherein the output devices are computing devices, wherein databases store data and configure bi-directional transmission of data to and from multiple SSDD systems, wherein the user systems, the access systems, and the SSDD systems are computing systems, and wherein one or more user, access, and SSDD systems store and provide at least partial copies of portions of a master database, and wherein the master database can also include partial databases and each of the databases are linked and communicate with each other and wherein the user, access and/or SSDD systems include one or more logging and monitoring databases that provide statistical and numerical calculations utilizing data that contains the information.

The one or more SSDD systems authenticate using a first set of computing operations, and validate using a second set of computing operations, and wherein a third set of computing operations controls access for a specified set of users of the SSDD systems and wherein data associated with the operations is securitized or encrypted or securitized and encrypted.

In another embodiment, one or more transaction secured computer-based dealership concierge service predictor (CSSDD) wherein the transaction and/or transactions are secured by one or more access devices or one or more user devices or both one or more access devices and one or more user devices comprising: at least one computer processing unit (CPU) with computational capabilities that is connected to and controls a computer memory via an address bus and a data bus where the address bus accesses a designated range of computer memories and range of memory bits and the data bus provides a flow of transmission(s) into and out of the CPU and computer memory; one or more real and/or physical or one or more virtual master distributed auto-synchronous array (DASA) databases or both one or more real/physical and one or more virtual master distributed auto-synchronous array (DASA) databases located within or external to the access devices and the user devices, where the master (DASA) databases at least store and retrieve data and also include at least two or more partial distributed auto-synchronous array (DASA) databases, wherein the partial DASA databases function in either an independent manner, a collaborative manner or both an independent manner and a collaborative manner, wherein the master and the partial DASA databases analyze and provide information in a form of data and act to control one or more output devices, wherein the output devices are computing devices, wherein one or more output devices create user devices, and wherein the master and the partial DASA databases configure bi-directional transmission of data to and from multiple partial user devices, to and from multiple partial access devices or to and from both multiple partial user and multiple partial access devices, wherein the user devices and the access devices are computing devices, and wherein one or more partial user and one or more partial access devices store and provide at least partial copies of portions of the master DASA databases, and wherein the master DASA databases, the partial DASA databases or both the partial DASA databases and the master DASA databases are linked and communicate with each other as well as inclusion of one or more logging and monitoring databases that provide statistical and numerical calculations utilizing data, wherein the one or more access devices authenticate using a first set of computing operations, and validate using a second set of computing operations, and wherein a third set of computing operations controls access for a specified set of users. This embodiment and the concepts and utilization of securitization and encryption of the data is included in U.S. Pat. No. 10,154,021 issued Dec. 11, 2018 which is hereby incorporated by reference in its entirety.

DETAILED DESCRIPTION

Figure 3:
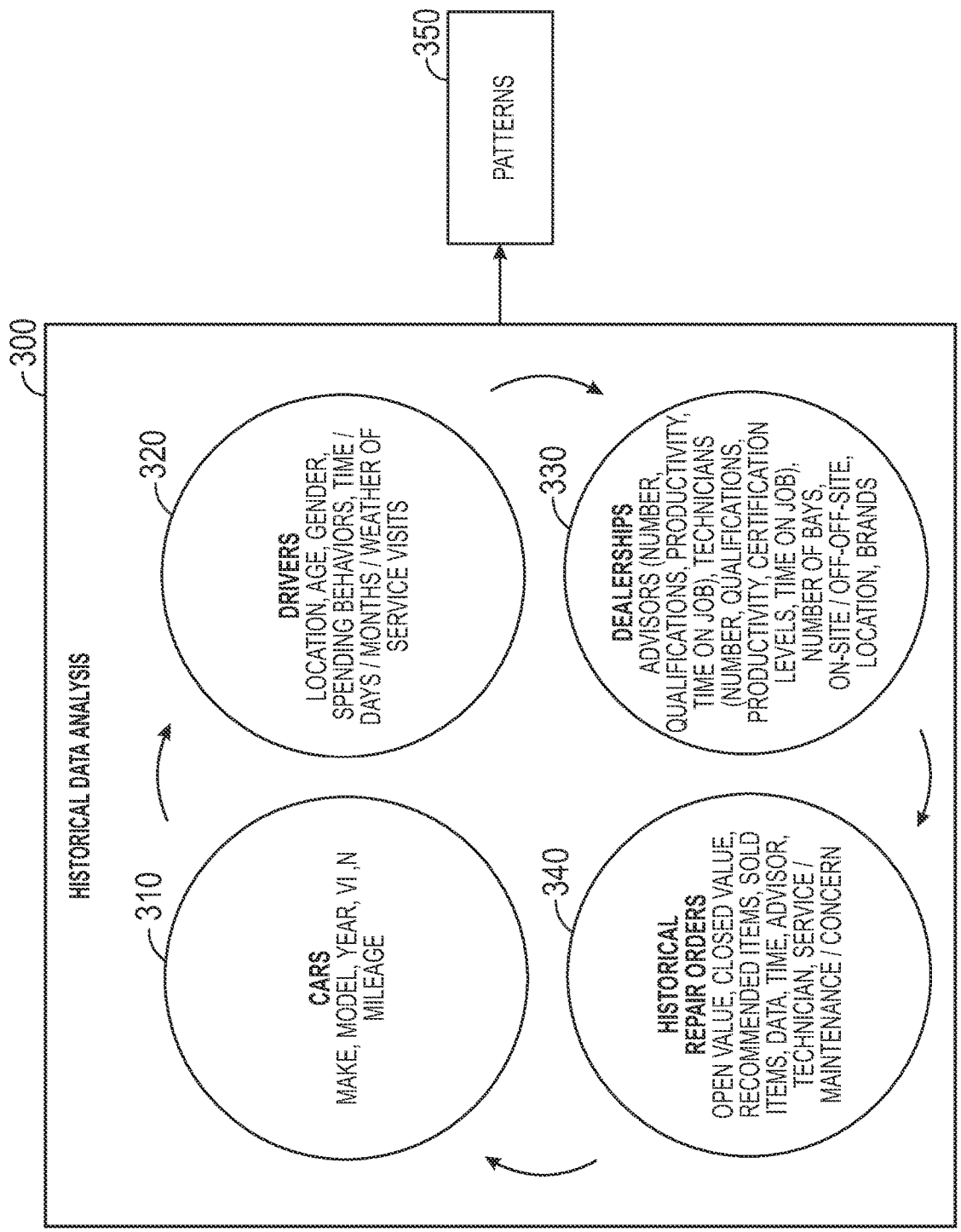
FIG. 3 is a schematic and flow chart that represents the Historical Data Analysis Analyzer of the SSDD tools.

In order to accomplish the present disclosure describing the (Carmen for automobiles) Service Scheduling and Dispatch Device (CSSDD or SSDD) that determines, schedules, details, and individualizes real-time and future visits for a vehicle that either abruptly (i.e. in an unscheduled manner) enters the dealers' workshop or has been scheduled (or "booked") for service as well as providing information to optimize dealership/business performance and profitability, it is necessary to access, produce, analyze and report acquired data. Here, the data generated are unique to the SSDDs with or without a kiosk. A dashboard and/or kiosk both could provide a GUI (graphical user interface) for the Service Scheduling and Dispatch Device (SSDD) but are optional. For this disclosure software together with external digital voice assistants/web APIs/databases (which are optionally securitized and encrypted), enables users to receive and protects the predictive analytics as it is deployed. These voice assistants/web APIs/with the included access to databases are a portion of the hardware/software ecosystem that automates the SSDD process. For automobiles we have adopted the term Carmen SSDD and this data includes at least the following;
 a. Historical repair order information (booked service items, recommended items, sold items) from
  i. Particular store/business location
  ii. Region
  iii. Vehicle brand (make) and model
 b. Historical vehicle owner's spending patterns
  i. Type of recommendations previously purchased
  ii. Percentage of recommendations previously purchased
  iii. Dollar amount spent per visit
  iv. Service visit frequency
 c. Time of day when the vehicle arrived at the store
 d. Technician's number and type of recommendations
 e. The value in currency of the technician's recommendations
 f. Technician's recommendation rate based on year, make, model and mileage
 g. Advisor close rate on recommendations percentage
 h. Advisor close rate on customer pay recommendations
 i. Advisor recommendation rate based on year, make, model and mileage
 j. Vehicle make/model/year/mileage
 k. Driver's age group/gender/location
 l. Time of year/month/weather
 m. Dealership location
 n. Dealership business hours
 o. Number of shop bays
 p. Number of shop technicians
 q. Number of advisors
 r. Repair order/hours sold and actual ratio number for technician
 s. Repair order/hours sold and number of bays actual ratio number The historical data analysis is depicted in FIG. 3 and indicates data that can be utilized to provide predicative patterns. These patterns are then analyzed and develop the basis for the final predictive audio, visual, and/or audio-visual reports.

The process for predictive analysis includes pattern recognition and one or more predictor devices that utilize a combination of content-based analysis of historical repair orders together with a content-agnostic analysis of a combination of the data input factors indicated in FIG. 3.

By the application of content-based analysis of the content of historical repair orders, the textual description of line items recommended and sold, and based on historical transaction outcomes, it is possible to predict the probability and quantity of purchases that a customer will make for servicing the vehicle. Based on the historical data, content-agnostic systems will learn based on low-dimensional representations for users and products. The basic concept for SSDD is that the data indicates how similar customers, driving similar vehicles, in similar locations, etc., will approve similar recommendations. Both methods, content-based and content-agnostic have been combined into an ensemble model in order to improve the final predictive patterns and their outcomes.

In order to provide the prediction capabilities, content-based and content-agnostic analysis can access analyze and utilize a variety of different data patterns and associated probabilities. The SSDD devices and associated system(s) utilize heuristic, initially low precision methods to calculate, enforce, and/or inhibit resulting in outcome probabilities in order to achieve predictive optimization models. The predictive optimization models improve outcomes with each successive repair and other service transactions for individual and/or fleets of vehicles. In order to provide the prediction capabilities, content-based and content agnostic analysis will return a variety of different patterns. The SSDD devices and associated system utilizes heuristic, initially low precision methods to calculate, enforce or inhibit resulting outcome patterns to drive predictive optimization models. The probability models are further automatically enhanced by the outcomes of each next repair order transaction. Specifically, when there is limited data, techniques including alpha smoothing, Bayesian prior distributions that are uniform are invoked. Domain knowledge provided by subject matter experts is used to set hyperparameter values of Bayesian graphical models in order to derive probabilities regarding business metrics.

For the present disclosure, at least two types of predictions are available by utilizing a SSDD device;
 1. Ad-hoc, real-time predictions on each vehicle service visit as appointments or repair orders are generated
 2. On-demand, business intelligence reports
 3. Predictive workshop capacity calculations, workshop-wide and separately, broken down by service teams and technician skillsets.

To train the machine learning algorithm to recommend correct operations historical data about previous vehicle service visits is a requirement for the SSDD system. For each such appointment, information about the vehicle (such as its model, mileage, year of production, history of previous repairs), information about the client (e.g. demographics, ideally historical vehicle spending patterns, mood and mindset at the time of vehicle servicing) and general information such as date of visit (the time of year might be relevant) and location must be obtained. This data is used as input to the machine learning model of the present disclosure. It is necessary to use information that is predictive of which vehicle services will be eventually sold.

Moreover, for each of these vehicle service visits, a list of vehicle services/operations that were recommended and a list of which of these were actually sold is required. This data generated is used as targets for the machine learning model and allows for the AI functionality. As more data is generated and stored/accessed, the databases become more robust and can be utilized to develop predictor reliability. In the test phase, only predictor variables are sufficient and target variables can easily be predicted. More difficult variable predictions are possible with the use of the SSDD devices and associated systems. This is a critical aspect of the present disclosure, because supervised learning is utilized, and the model learns by comparing its predictions with the targets.

Additionally, to calculate (or use as targets and train a separate model to predict it) items such as the total number of hours the vehicle will be in the bay/workshop and what equipment will be required, we need information about such requirements for each operation that can be recommended.

Predictive Algorithms

The SSDD devices provide ad-hoc, real-time predictions on each vehicle service visit as an appointment or repair orders are generated.

Content-based and content agnostic analysis will return a variety of different pattern outcomes. The SSDD devices and associated systems will utilize low precision methods to calculate, enforce and/or inhibit resulting outcome patterns to drive predictive optimization models. The probability models will thus be further automatically enhanced by the outcomes of each next repair order transaction.

In one embodiment, machine learning will be applied to predicting, for each operation (e.g., type of repair), the probability with which this mechanical operation will be needed and sold. Based on performance of predictive algorithms which SSDD determines by assessing prediction accuracy scores, the remainder of the important values are obtained by hard-coded rules. For example, in the "Concierge app" (one of the first implemented applications of the SSDD), five (5) services are recommended with the highest probabilities of the need and request being assigned to each of the services. The total number of hours the vehicle will be in the bay/workshop is calculated by summing the durations of operations with probabilities exceeding a certain threshold. Statistical models that include Bayesian graphical models, machine learning models including neural networks and random forests are all employed to derive predictive probability densities for target variables. Utilizing these techniques and models, it is possible to predict target variable values and limits on these values with increasing accuracy. Also, needed parts and equipment are determined and the list of parts, equipment and repair/upgrade is obtained from the SSDD prediction (including the AI modules) regarding which options and service operations will be sold to the customer/consumer.

Next, these values are used as targets that are subsequently utilized to train separate models to predict them directly based on the same input data. The artificial intelligence (AI) aspect of this embodiment is that as more values and associated targets are developed that can be added to databases or stored or otherwise accessed, the more accurate and precise the predictions will become. It is important that the SSDD devices and systems utilize both techniques to determine which one yields better performance metrics including many state of the art supervised machine language techniques.

In this embodiment, the "machine learning problem" is framed or known as a supervised multi-label classification with missing labels. The multi-label portion allows for the situation where there often is more than one correct answer—more than one of the recommended services might be purchased by the customer/consumer. "Classification" in this case means that each operation model provides outputs with probabilities addressing how this operation will be sold to the user given the (over time optimized) input circumstances (information about the vehicle, its owner, time of year etc.).

"With missing labels" means that the SSDD recommends only a limited subset of operations during each appointment, so for many of them it is unknown whether they would be actually sold if they were recommended.

The exact algorithm used in the framework of supervised multi-label classification is determined empirically and these empirical iterations will continue over time based upon data developed within the dynamic databases. The specific machine learning models that fit this framework include at least the Gradient Boosted Decision Trees and Neural Networks models. There are numerous well-known algorithms available for solving multi-label classification problems. These include multilabel K nearest neighbor, neural networks, and decision trees. Each of these algorithms provide better predictive accuracies compared with other known algorithms depending on the data and data sets available. The SC device(s) checks for the accuracy of the predictions derived from each of these algorithms periodically and chooses which of the algorithms to employ based on the datasets of business metrics available to achieve the best predictive analytics.

Predictive Business Intelligence Reporting for a Vehicle Dealer, Distributor and Manufacturer Including a Predictive Analytics SSDD Dashboard For each vehicle manufacturer, distributor, and separately each dealership/business, it is necessary to collect a large amount of critical data that involves the business activities of each of these entities. The SSDD devices and system also utilizes data specifically captured by both hardware and software modules described in more detail below. These modules access data that includes customer emotions, topics of concern, repair orders associated with natural language terms and strength of association when the customer interacts whit the SSDD. Such data includes, but is not limited to:

shop revenues average repair order values parts used for repairs number of serviced vehicles traded in and upgraded number of staff members needed for repairs predicted workshop capacity requirements based on variable consumer demand and maximum workshop potential throughput The business value to reliably forecast the data listed above is immense, as there are no devices or systems currently in place to provide these forecasts with the immediacy, accuracy, and precision that the present disclosure regarding the SSDD provides. Together with the increasing improvement of artificial intelligence, dynamically driven databases, and computational capabilities, using increased historical data and power of time series analysis, it is now possible to achieve this reliable forecast in the form of the predictor devices and systems as presently disclosed.

In addition, it is important to understand how to proceed when anomalies in the data sets arise. For the SSDD dashboard and/or a kiosk, for example, unique data generated from the kiosk along with available data and data sets from other sources is used to provide predictive insights and early alerts for each vehicle or vehicle fleet. These predictive insights can then be transferred to the vehicle dashboards, back to the kiosks, or to other external hardware/software interfaces within virtual and/or real devices as needed to improve customer experience and dealership/vehicle related business revenues. It is possible, for instance, that the revenue of some dealership(s) might increase more rapidly than trends and seasonality "learned" by the models described would suggest. It is necessary and good practice in this case to provide an automatic alarm of such occurrences and search for the possible reason that data anomalies have arisen to be able to correct for these anomalies as needed. Unique data generated by the SSDD kiosk along with available datasets is used to produce predictive insights and early alerts that are in turn available for us in dashboards, and other external software and hardware systems that improve the customer's experience and also increases revenue for dealerships and other entities that can utilize the SSDD.

Figure 5:
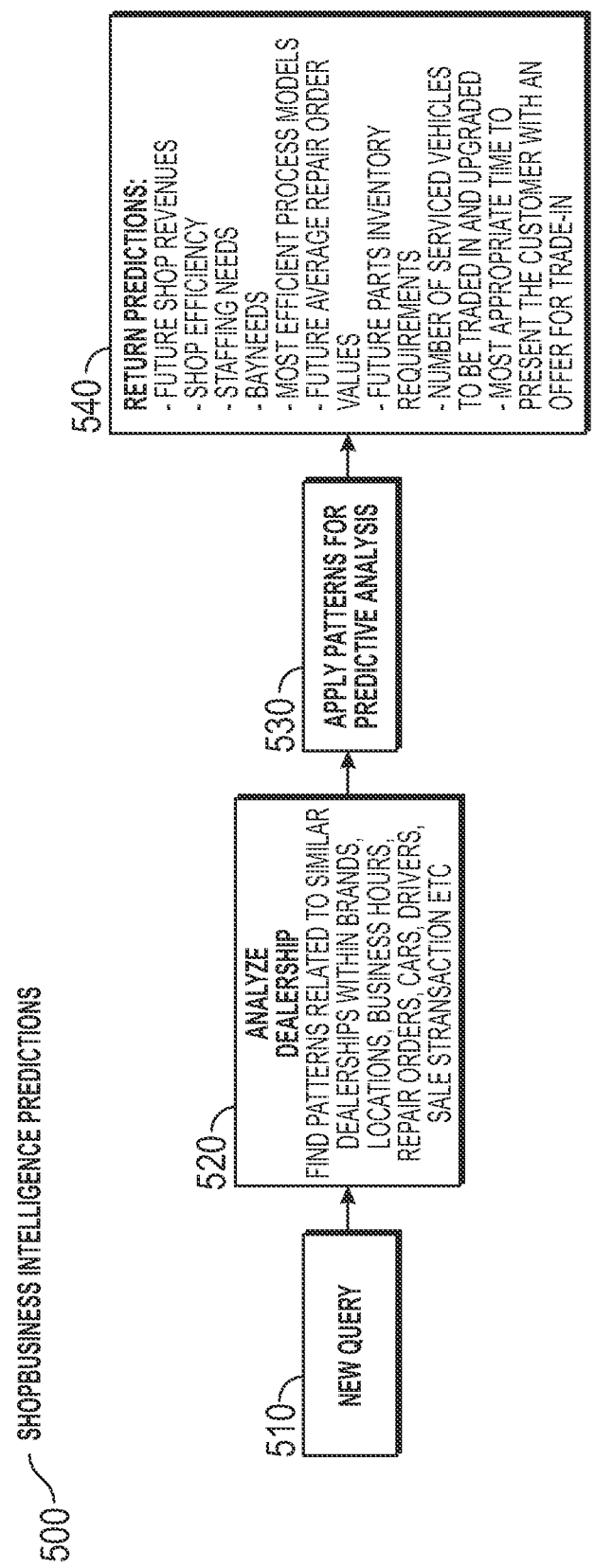
FIG. 5 is a schematic and flow chart that represents the intelligence predictor capabilities of the SSDD tools.

As alluded to earlier in FIG. 5, data patterns for prediction analytics that are similar to one another can be found using various similarity metrics such as cosine similarity, jaccard distance, KL divergence, etc. These metrics can be applied to a raw data set or derived data sets from data transformations (such as text pre-processing techniques including stemming and numeric data transformations such as log transformation)

More specificity regarding the use of the data and associated algorithms is provided below;

Data Collection and Use

To train the machine learning models it is necessary to collect historical data focused around, but not limited to, all the variables for predictor device (SSDD) forecasts (including shop revenues, average repair order values, service recommendations, customer behaviors, etc.) for an ever-increasing number of large data subset databases obtained from vehicle dealerships. Moreover, data is stored within databases that includes business hours, location and brand of dealerships that we don't want to forecast (because they're more or less constant) but are predictive of variables of interest and which are useful in providing further capabilities for the SC. Similarity of a test data item compared to trained data items with respect to predictor variables is used to calculate the value of dependent variables for test data items. Patterns that are similar to one another can be found using various similarity metrics such as cosine similarity, jaccard distance, KL divergence etc. These metrics can be applied for raw data and/or or derived data sets derived from data transformation(s) (including text pre-processing techniques e.g., stemming and numeric data transformations and log transformations).

For the present disclosure, it is necessary and possible to model the dealerships as a time series, so that all the variables (those to be forecasted and those predictive of them) are appropriately labeled with the corresponding date (e.g., average repair order value on a certain date such as Feb. 13, 2019).

In the case of the need for anomaly detection, it may be necessary label unexpected, anomalous events (to provide knowledge of the dealership and the time of occurrence of such anomaly) for the purpose of continuous re-evaluation of the prediction models utilized within the SSDD devices and associated system. Anomaly detection can also be handled as unsupervised machine language (ML) problems with no labels required. For example, the user may want to know the number of vehicles entering a dealership on a daily basis. Without any data received in advance and without fixing any rules before the use of the SSDD, advanced algorithms can determine whether there will be an unusually large number of vehicles at a dealership on a given day. Such automated anomaly detection can be used to predict future anomalous events at dealerships.

Algorithm(s)

There are traditional methods that can be utilized for time series analysis that allow modeling trends and seasonally for the sequential, time-dependent data as obtained with the SSDD devices as the data includes moving averages and autocorrelations. Nonetheless, the methodology used includes a modern method that is a type of recurrent neural network: Long-Short Term Memory (a.k.a. LSTM) applied to our predictive algorithms is at least one of the techniques that is utilized in creating the SSDD.

Recurrent neural networks, a class of machine learning models, are well suited for these modeling sequences. In particular, LSTMs have been shown to be very good at capturing long-term dependencies in such sequential data. LSTM is a system architecture which can build recurrent neural networks that represent a class or statistical algorithms. On such LSTM is a time series LSTM model which sorts through historical data of, in this case a vehicle dealership one day at a time (or week or month), and it is dynamically changeable with time resolution) and the data must contain all the values of all variables (e.g., average repair order value on a given day, number of repair orders).

After some time, the LSTM model portion of the SSDD "learns" the underlying data patterns and is able to generate the continuation of the sequence with reasonable accuracy. More specifically, the LSTM portion can generate the continuation of a sequence after the present day, and therefore forecast the future values of most if not all business variables of interest.

The Anomaly Detection in Time Series with LSTMS

The anomaly detection is performed by measuring how much the actual data differs from the predictive forecast of our LSTM model. If it differs too much, then this is deemed an anomaly and the information saved indicates that an unexpected event occurred at a given time at a given dealership. In some cases, there might be some delay in anomaly detection because we want to examine longer periods of time to avoid the model being mis-lead by noise.

SSDD Predictor Workflows;

Further embodiments describing multiple process workflows for the SSDD are described next.

More concisely, the SSDD is a distributed, cloud-based system aimed to enhance customer experience by using artificial intelligence and automated processes in the vehicle servicing process. There are 3 main components (a-c) of the process:
- a) A scheduling/appointment booking process which includes in-car voice assistant experience
- b) A pre-visit process that includes service reminders and estimates of the equity through an "equity mining" process. For the Equity mining process the SSDD: identifies if the customer's vehicle is eligible or suitable for an upgrade based on the value of the vehicle that the customer is currently driving that including finance repayments, current vehicle market value and residual finance value.
- c) The dealership/business visit process which includes self check-in using (and in some instances) a self-service kiosk device A more detailed description the basic processes (a-c) including technical diagrams as well as a detailed description of the Artificial Intelligence solutions utilized in the SSDD system is more concisely provided in steps 1-3 as follows;

1. Service Scheduling and Dispatch Device Understand AI (artificial intelligence) module 2. Service Scheduling and Dispatch Device Recommend AI (artificial intelligence) module 3. Service Scheduling and Dispatch Device Predictor AI (artificial intelligence) module These three modules are also described in detail below;

An appointment booking that utilizes one or more SSDDS and provides verbal and oral communications in connection with one or more websites. The booking can also be accomplished using text based or automated voice phone calls as well as other audio-visual communications systems.
- a. The appointment booking that utilizes one or more SSDDs includes;
  - i. The SSDD is placed on a dealer/business website allowing the customer to book an appointment to service their vehicle
  - ii. The customer(s) visits a dealer/manufacturer's/distributor's website where they can easily book a service using embedded features on the website
  - iii. The customer enters any unique identifier such as mobile phone number/vehicle registration number/VIN etc.

iv. The SSDD device assists with finding the customer in a Dealer Management System (DMS) based on the customer's identifier provided
v. SSDD responds confirming the identity of the customer
vi. SSDD finds vehicles associated with the customer on DMS
vii. DMS returns a list of vehicles
viii. SSDD requests that the customer chooses a vehicle which they want to service
ix. Customer confirms the vehicle
x. SSDD requests the customer for the vehicle mileage
xi. Customer confirms the mileage
xii. SSDD asks the customer if they want maintenance performed or if it is a concern
xiii. Customer's decision: Maintenance OR Concern
1. Customer Selects Maintenance
a. SSDD proposes service packages or items as recommended by manufacturer based on the details such as car mileage, make, model, year, customer's previous purchases etc. SSDD also allows the customer to select maintenance items, e.g., oil change, tires or full-service packages including service plans.
b. Customer confirms their choice
c. SSDD confirms the approximate cost of this maintenance
d. SSDD asks the customer if there are any other concerns
e. Decision: Customer selects Yes/No
  i. Yes—Go to concerns
  ii. No—Go to date confirmation
2. Customer Selects Concern
NOTE: In this section we address the use and reference to the SSDD Understand AI module. In addition, the (for the automobile Carmen Service Scheduling and Dispatch Device), the Understand AI module is described.
a. SSDD attempts to initially understand the concern
Option 1: In the learning phase of SSDD's "AI understand" module, SSDD lists a selection of concern types (2 levels of nesting)
1. Customer selects a concern
2. SSDD asks the customer predefined questions based on customer's answers (up to 3 levels of nesting)
3. Customer answers the questions 4. SSDD asks the customer to describe the issue using their own words.
ii. Option 2: once the AI is sufficiently trained by using increasing data sets
1. SSDD asks the customer to select the concern type (1 level of nesting)
2. SSDD asks the customer to describe the issue.
3. Customer describes the issue using their own natural language
4. SSDD utilizes using SSDD Understand AI module and attempts to understand the customer's intent and description of the issue.
5. SSDD if no sufficient information is gathered, asks the customer additional questions.
b. SSDD gathers information collected from the customer and:
  i. Prepares the information package for further analysis, pattern recognition and SSDD Understand AI input, based on data attributes including
1. Concern selected
2. Questions asked for the customer
3. Customer natural language description
4. Final Repair Order line item—this is the report issued for the service/repair process of the concern in question ii. SSDD automatically writes one or more line items in repair order using concern type selected and correlated with relevant operation codes along with customer's statement objective—consisting of the SSDD's questions and customer's answers, description of the concerns.
c. SSDD presents the customer with the cost of handling the concern and asks for confirmation.
d. Customer confirms
e. SSDD asks if there are any other concerns
f. Decision: Customer selects Yes/No
  i. Yes—Customer is taken to the beginning of concern identification step
  ii. No—Customer is taken to confirming the appointment date as described below
  ii. Date confirmation: SSDD requests that the customer confirms the date and time of the service visit and proposes service schedules
  iii. Customer selects one of the proposed service schedules
  iv. SSDD displays/communicates via audio, visual and/or manual electronic format interaction a summary of the customer's scheduled booking
  v. SSDD asks the customer regarding the best communication channel for future communications. This includes essentially all forms of electronic communications including phone, text, email, messenger/notification services which can be provided via one or more electronic hardware devices that possess
  vi. Customer confirms and provides the details of the channel
  vii. SSDD remotely creates an appointment object to internal/external database systems that are accessible to systems such as workshop time management software/dealership management system
  viii. SSDD sends the customer a message/notification via their preferred communications channel, with a summary of their appointment, including the booking number, a QR code, calendar specific attachment (such as iCal) and map system (e.g., Google maps) link with geo-location of the workshop.
b. Appointment booking through one or more electronic medium including automated voice assistants (Amazon Alexa, Google Assistant, Apple Siri, in-vehicle voice assistant, etc.)
  i. Customer invokes the voice assistant (e.g., "Alexa start Service Concierge"/"hey Google I want to service my car")
  ii. Voice assistant service connects to SSDD utilizing a graphical user interface GUI and public-facing API (applications programming interface) that retrieves and/or sends the customer's mobile phone number (on file with the customer's online Amazon/Google/Apple etc. account) or any other chosen identifier (e.g. RFID tag of the vehicle, VIN number of the vehicle etc.), and finds and retrieves the identity and customer information from all available dealership management systems (DMS) and manufacturer/distributor software systems connected and integrated with SSDD and the SSDD returns customer information to the voice assistant
  iii. If the voice assistant doesn't know the customer's identity or is unable to identify the customer via SSDD, the SSDD requests that the customer provides their identity information such as mobile phone number, etc.

iv. Customer provides their unique identifier, such as their mobile number
1. Case 1: voice assistant/SSDD finds the customer based on their identifier—proceed to Dealership/business selection
a. Case 2: voice assistant/SSDD does not have customer info Voice assistant/SSDD asks the customer to provide their details: Name, Email, Phone number and vehicle details: Make, Model, Year, Mileage
b. Customer provides the details.
c. SSDD creates a new customer profile.
  v. If the customer is known and identified, for this embodiment the Voice assistant asks the customer if they want to service their vehicle in a proposed dealership/business and provides a list of proposed dealerships/facilities or one dealership/facility.
1. Case 1: Customer confirms the dealership/facility selection provided
2. Case 2: Customer rejects the proposed selection or no relevant dealership/facility is found:
a. SC suggests appointments in the nearest dealerships/facilities based on the customer's or car's location.
  vi. SSDD finds vehicles associated with the customer on a dealership management system (DMS)/database or manufacturer database.
  vii. Dealership management system (DMS) or manufacturer database returns a list of vehicles belonging or managed by the customer
  viii. If there is more than one vehicle returned, voice assistant asks the customer which vehicle is to be serviced (e.g., 2018 Audi A4 or 2016 Audi Q5)
  ix. Customer confirms the vehicle to be serviced.
  x. SSDD attempts to tries to predict the current mileage of the vehicle, based on the vehicle data attributes, such as make/model/year/time of last visit and last known mileage and presents it to the customer via voice assistant and asks the customer for confirmation or asks the customer for the current mileage on their vehicle. This information can also be gathered automatically from the vehicle via connected car systems that include dashboard hardware/software GUI interfaces.
  xi. Customer confirms the mileage
  xii. Voice assistant asks the customer if they want to schedule vehicle maintenance or is concerned that maintenance should be conducted and if so for what item(s) and when
    In addition, the SSDD has the following additional capabilities;
a. SSDD may ask the customer to state the nature of the concern
b. Voice assistant requests that the customer describe the issue using their own language.
c. SSDD records the customer's statement
d. SSDD asks the customer up to 3 follow up questions trying to better understand the issue.
h. For an additional specific case when the nature of the concern requires that the customer may request roadside assistance:
  i. If the customer's vehicle is immobile or in any case when the Understand AI will conclude that the customer may require roadside assistance, SSDD via voice assistant, may ask the customer if they require roadside assistance.
  ii. If the customer confirms, SSDD asks the customer to confirm the vehicle location.
  iii. SC communicates the customer's request to the roadside assistance provider via the roadside assistance service API which accepts data with the following parameters:
    1. Customer name and phone number
    2. Vehicle make/model/year
    3. Concern information gathered so far
    4. Vehicle location
b. Voice assistant communicates to the customer the diagnostic fee amount and asks for confirmation.
c. Customer confirms
d. Voice assistant asks the customer to confirm the date and time of the visit (see appointment booking via web widget for details)
e. Customer confirms date and time
f. Voice assistant sends the date and time to the SSDD API
g. The SSDD API returns a summary of the customer's booking to voice assistant service
h. Voice assistant reads the extent of the order to the customer and asks for confirmation
i. Customer confirms
j. Voice assistant asks the customer if the mobile phone number or any other communications channel of customer's choice number on file would be best to send further updates and notifications
k. Customer confirms or may provide details of a different communications channel
l. SSDD automatically creates an appointment object on DMS via DMS API
m. SSDD sends the customer a confirmation message on the preferred communication channel, with a summary of the appointment, including the booking number, with a digital calendar object attachment and workshop geolocation details as well as an QR code representation image of the appointment details (e.g., date, time, appointments number).
2. Customer selects service:
a. SSDD based on the car mileage requests service package as recommended by manufacturer or allows customer to select maintenance items, e.g., oil changes, tires, engine/emissions updates, etc.
n. Voice assistant asks the customer to select the package
o. Customer confirms their choice
p. SSDD/voice assistant confirms the approximate cost of this maintenance
q. Voice assistant asks the customer if there are any other concerns
r. Customer selects Yes/No
s. Decision: Customer selects Yes/No
  i. Yes—Go to concerns
  ii. No—Go to date confirmation
After the booking, before the customer's arrival to the dealership/vehicle associated business (no Valet option selected)
a. SSDD sends the customer a reminder message utilizing their preferred communications channel, in advance of the appointment date. Typically, these reminder messages are sent 24 hours before the appointment.
b. Subsequently, SSDD sends the customer a message if they would like their vehicle appraised
  i. This message will be sent right after the appointment reminder message. If the appointment date is sooner than in 24 h, this message should be sent right after the confirmation date.

ii. The message should be sent only, if certain equity mining conditions are met—based on the dealership/brand preference settings:
1. Vehicle must not be older than the age specified in the dealership preference settings
2. Vehicle must not have a mileage higher than the amount specified in the dealership preference settings
3. Vehicle equity must be as specified in the dealership preference settings
    iii. Customer responds Yes/No
    iv. If the customer responded with Yes—concierge sends the customer a text message "Thank you, I have arranged a meeting with used cars manager. They will meet you at the reception upon your arrival".
  c. SSDD notifies the used cars sales manager in the dealership by email of the appointment created, including iCal attachment, customer's name, vehicle year, make and model and VIN number (if known it by that time).

The customer's interaction is enabled by the SSDD, for example, with audio communications capabilities such that each element of the conversation between the customer and the SSDD is loaded onto the screen upon the completion of the previous step. Customers can use any digital channel for communication with the SSDD for example, through voice (speech recognition) input or touchscreen/keyboard entry. The SSDD responds to the customer by one of several options including on-screen displays with and without kiosks, notifications, messages and voice and utilizing various forms of hardware including smart phones, laptops, in-vehicle dashboards with GUIs, etc.

The most recent text-to-speech and speech-to-text algorithms are implemented in the SSDD thereby enabling the customer to interact with SSDD with natural language.

One embodiment of a workflow for the SSDD is as follows:
1. The SSDD has the ability to identify vehicles entering the service drive scan e.g. by scanning vehicle number plates, RFID sensors, NFC etc. If vehicle identification is successfully accomplished, the identity of the vehicle is used for retrieving the appropriate booking details.
2. If SSDD returns a valid customer's booking—their original booking is displayed on a list on the SSDD terminal screen and can be highlighted as needed.
3. If vehicle identification is not accomplished, the customer can use other digital channels to retrieve their booking details, for example they can scan their booking confirmation QR code or enter a booking number to retrieve their booking.
4. If the customer doesn't have a booking (e.g., a drive-in scenario)—a temporary appointment object is automatically created for both the SSDD and the SSDD DMS, upon the customer's check-in process. The temporary appointment object consists of customer and vehicle details, date, time and appointment ID.
    ii. Customer confirms their identity and vehicle by interacting with SSDD, e.g., by confirming their name and vehicle, or mobile number on the kiosk screen.
    iii. SSDD devices presents to the customer (e.g., displays on the kiosk screen) the customer's appointment information—a summary of the items provided by the customer at the time of booking an appointment or returned from the temporary appointment object.
    iv. Customer confirms the appointment details.
    v. If there is at least one concern type, listed on the appointment summary, and the customer did not explain the concern in sufficient detail at the time of appointment booking, or the SSDD Understand AI module could not interpret the concern types at the time of appointment booking, SSDD asks the customer to explain the concern using their natural language, if customer had not used natural language to explain the concern during an initial attempt for appointment booking.
    vi. SSDD here is based either on manual selection of the concern type, or automated natural language processing, utilizing the SSDD Understand AI module that will derive concern type and then ask the customer follow up questions trying to better understand the concern and derive meaningful symptoms from the appropriate database(s). SSDD will ask these questions by accessing data from data at rest in databases or data on the move that is being sent via transceivers utilizing digital channels such as voice based/text based/touch screen based input and associated output.
    vii. Symptoms data derived from this conversation will be subsequently matched with the actual cases/service operations.
    viii. SSDD records the customer's statement (a summary of customer's natural language input and questions and answers subsequently given) for future use for creating a repair order document.
    ix. The SSDD communicates that further investigation will be performed by service technician
    x. The customer may provide additional comments.
    xi. The SSDD Recommend AI module (a recommender device), based on analysis of historical data will recommend items/additional services. Examples of historical data includes the following;
1. Historical data for current customer (past repair orders), including customer's previous purchase habits
2. Information on current process (questions and answers from decision tree processes)
3. Information regarding user purchased product in the past (or not)
4. Vehicle year/make/model
5. Previous vehicle service history
6. Similar vehicles historical repair orders information
7. Time of year
8. Weather
9. Dealer preference settings e.g. mandatory upsell items
10. Mindset of the customer including mood at time of-service request
    xii. These recommendations (via a recommender device) can utilize various approaches in machine learning (ML) to recommend additional services (including service name, additional time required to perform the operation and their cost) or items. Approaches include those that heavily use the textual and numeric data to find similarities with current customer(s) with other customers who have made prior purchases. Content agnostic algorithms can also be used. Supervised machine learning approaches can yield more optimal results.
    xiii. The customer makes a decision to add any of the recommendations to their order which would modify the appointment objective and subsequently populate and/or repopulate the repair order.
    xiv. Based on the vehicles identification, SSDD retrieves the recall campaign information data from 3rd party (external) databases including manufacturer recall catalogued data.

xv. If there is an active recall campaign for the vehicle—SSDD communicates this fact to the customer and allows for a decision to add the recall operation to the order, which can be offered at no cost.

xvi. The SSDD can display a summary of the order with a list of selected services, their cost including tax and total approximate time to execute repairs or maintenance.

xvii. SSDD asks the customer for legal approve of the process, using various digital channels, such as but not limited to signing the order electronically on the screen.

xviii. SSDD asks the customer to confirm their preferred communications protocol for receiving further notifications and sending a digital copy of their repair order.

xix. SSDD may ask the customer to make a payment or pre-authorization of the payment through any digital or physical payment methods or devices including card payment, e-wallet payment, QR code scan-based payment, RFID payment, digital currency, etc. Physical payment may include actual use of physical currency into the machine.

xx. SSDD may acknowledge the state of the transaction by physical (e.g., printing a receipt) or digital (e.g., sending a digital copy of the receipt by a Short Message Service (SMS) that normally available on cellular telephone networks xxi. Depending on the expected service time, SSDD may offer the customer with the options for the alternative transportation, such as, for example:

1. Loaner vehicle
2. Shuttle service
3. Taxi or rideshare services xxii. SSDD provides the customer, based on their transportation selection, the ability and facilities sufficient for the customer to receive their choice. These options are shown as options via channels either directly through a vehicle dashboard or even using a kiosk, using messages, mobile phones, messenger services etc. and customer feedback is received via the same channel used by the customer. For example, the following options are presented to the customer:

1. Automated loaner vehicle dispatch process
2. Rideshare or taxi services ordering process xxiii. The SSDD communicates to the customer the next steps regarding the repair or service and informs the customer that they will be updated on the process via their selected communication channel.

Service Updates, Final Payment and Vehicle Return xxiv. The SSDD notifies the customer of the progress with the repair by text.

1. Notification once the vehicle entered the shop including expected repair completion time.
2. Notification once the vehicle is being washed and prepared for collection.
3. Notification once the vehicle is ready for collection
   a. A summary of the final bill including itemized services, parts and labor and the total amount for the service which at this point will be charged to the customer's card on file.

xxv. The final payment is charged to the customer's payment method.

xxvi. Customer receives an electronic summary of their bill by text.

Detailed Description of the Figures and Working Embodiments

In addition to the descriptions given above regarding the functionality of the SSDD service scheduling and dispatch device(s) and associated system(s), working example(s) are provided and described with figures that represent one or more primary flow paths and processes required for one or more embodiments of the present disclosure.

For purposes of this disclosure, SSDD user interface refers to a channel with a user interface such as a mobile device or a kiosk with a touchscreen including computational (software) with the capability of providing data communications channels required for full functionality. the Service Scheduling and Dispatch Device (SSDD) Customers/consumers interact with the SSDD device(s) via such SSD user interface. Backend refers to data storage systems and associated software hosted by these SSDD devices (and assorted AI modules) that can read, write and manipulate datasets. Publish-Subscribe, refers to a message queue paradigm imbedded in software-based computations whereby senders of information (publishers), send data to an abstract class of recipients (subscribers), without specifying individual recipients. The figures refer to a Publish-Subscribe approach for communication between the server or the backend and many clients or many user interaction sessions in the SSDD user interface. API refers to one or more application programming interfaces which are software interface(s) for communication between at least two software objects in a computer memory. DMS refers to one or more dealership management systems that includes data storage systems and associated software. A channel is a software object that represents a user interaction session that can be displayed within a vehicle or on a website or kiosk, etc. A vehicle set is a unique combination of make, model, and manufacturing year of a vehicle. UI refers to a user interface which denotes a hardware or software device with which a human user can interact via communication media data (including analogue, digital, and optical signals) that transmit data via a keyboard, digital voice assistant, smart phone or other computing appliances. VIN refers to vehicle identification number and is used for uniquely identifying vehicles. The UAI module is an Understand Artificial Intelligence module that can be hosted on these SSDD devices.

Figure 1:
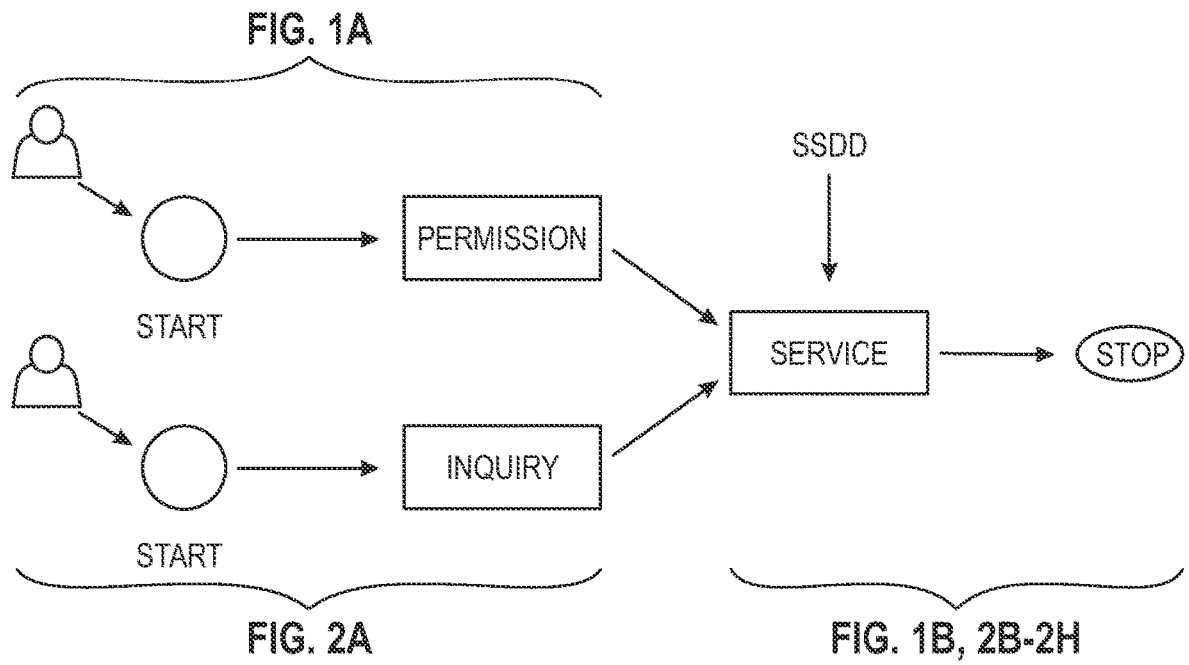
FIG. 1 is a schematic and flow of the full Carmen Service Scheduling and Dispatch Device (CSSDD).

Specifically, for FIGS. 1A-1B, the following flow process is as follows;

FIGS. 1 and 2 Working Example(s) and Embodiments that Utilize the SSDD

At least two processes exist in order to use the Service Scheduling and Dispatch Device (SSDD) which we refer to as the Carmen SSDD. The first process (Process #1) provides the ability for a user to be provided (by subscription) permission for information regarding automatic transmission of information. This customer is then known as a "permission customer". A permission customer can revoke the subscription at any time and become an "inquiry customer". The second process (Process #2) provides for a "guest user" or "non-subscribed user" that is hereafter known as an "inquiry customer". Information about the vehicle from the "inquiry customer" is not provided wirelessly in real-time via a manufacturer API, but instead is provided by the inquiry customer. In this case, a menu with a list of recommendations for the vehicle results. An inquiry customer can become a permission customer that is provided automatic transmission of information regarding the vehicle at any point in time.

Process #1: The Permission Customer Tool

Figure 1A:
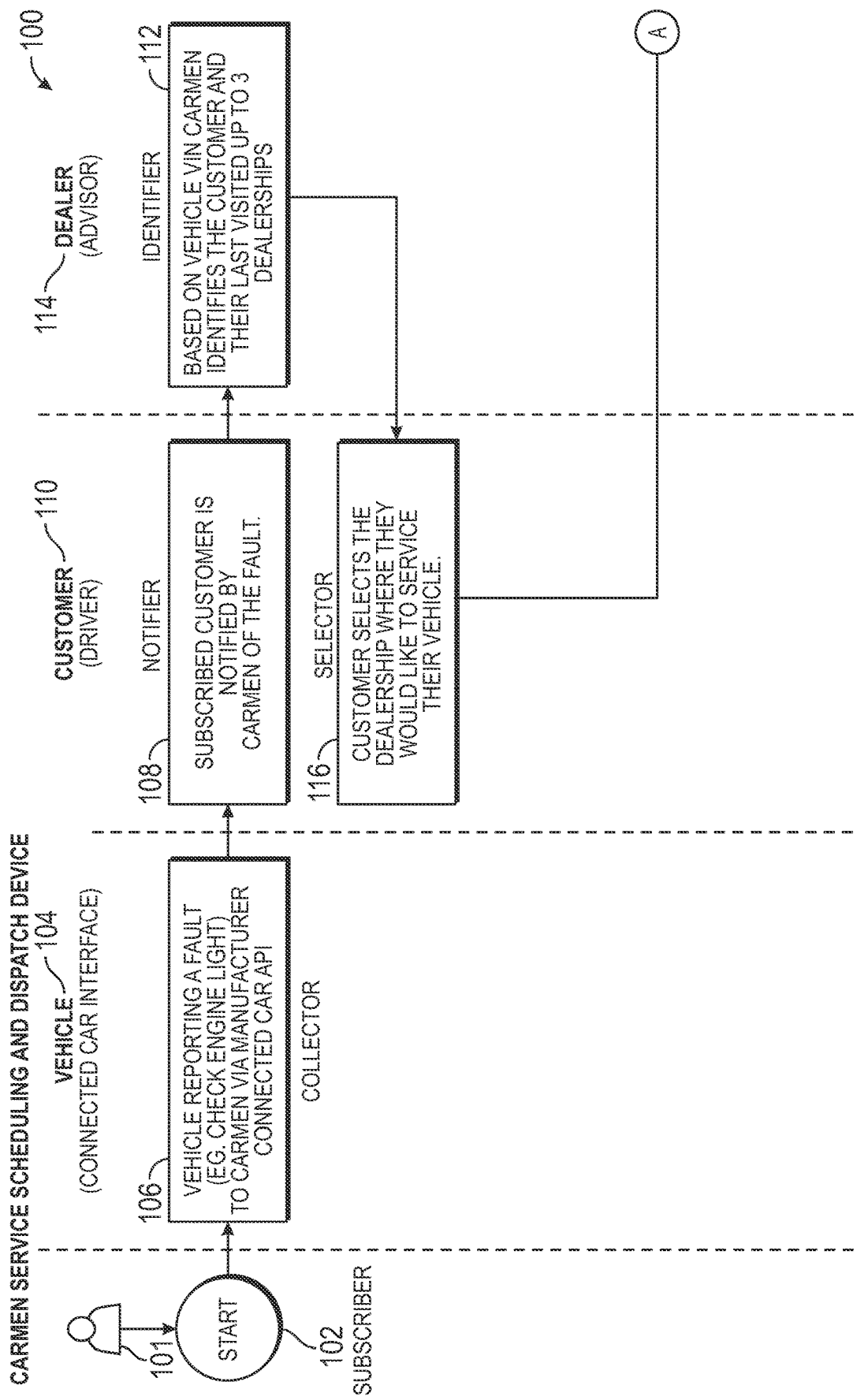
FIG. 1A is a schematic and flow chart that represents the Carmen Service Scheduling and Dispatch Device (CSSDD) detailing the vehicle connected car interface river and advisor.

For FIG. 1A, here a user [101] subscribes for permission [102] to a collector device that collects and wirelessly transmits vehicle information to the Carmen Service Scheduling and Dispatch Device (SSDD) [100] that is a tool used for connecting the customer's vehicle, which is a connected vehicle [104], via a connected car interface, such as the manufacturer's connected car application(s) programming interface (API). The connected vehicle [104] reports [106] a "fault" (e.g., check engine light) to the Carmen (for automobiles) SSDD [100] which notifies [108] the permission customer [110] of the "fault".

At the time of notification [108] a provider provides notification to the permission customer [110], Carmen SSDD [100] identifies [112] via an identifier, the customer, as well as the last visited dealership(s) [114] (up to three) based on the vehicle VIN. The permission customer [110] selects via a selector [116] the dealership [114] where they would like to have their connected vehicle [104] serviced, based on the actual need of service or at least the perceived need of service. The Carmen SSDD [100] uses information provided by participating manufacturers' APIs, dealerships, and other industry data providers to match the connected vehicle [104] with the properly selected correct automotive technician based on their required skill set(s) and historical efforts regarding performing the identified service at the dealership.

Figure 1B:
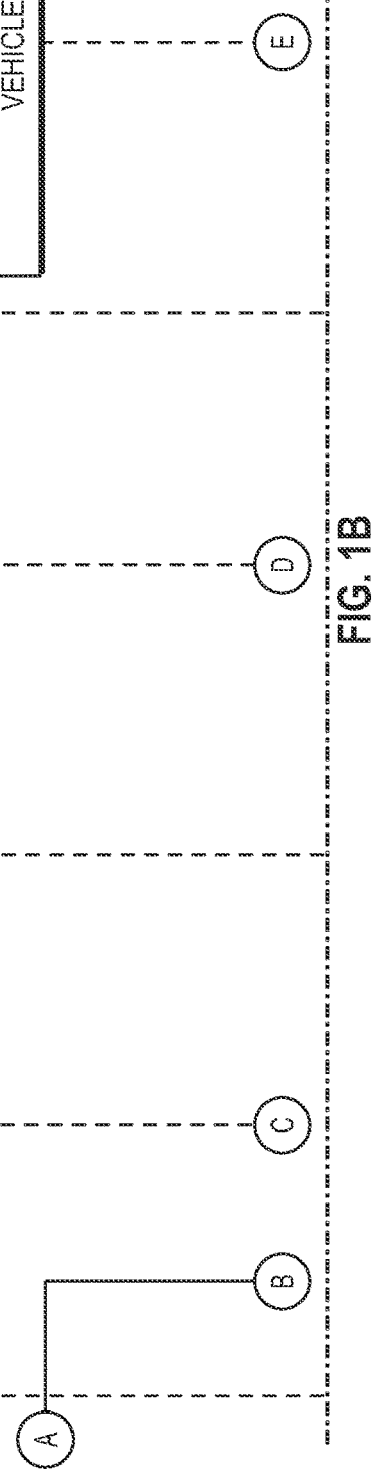
FIG. 1B is a schematic and flowchart that represents the Carmen Service Scheduling and Dispatch Device (CSSDD) detailing the service, service teams, and time value menus.

FIG. 1B depicts the functions associated with the Carmen SSDD [100] to the user [101]. The Carmen Services Menu Provider [118] is made available to the permission customer [110] (and inquiry customer [210], later described) and consists of menu items and information [119] pertaining to the service and maintenance of the connected vehicle [104] including OEM service recommendations and menu serviced items provided by dealers or dealer groups, auto-subscription-based companies, and other vehicle providers. The services menu provider [118] contains a menu [119] with services containing tier operation codes, descriptions, pricing and their allocated (default) and actual (historical) times required to perform the services as well as providing the proper service teams.

Figure 2A:
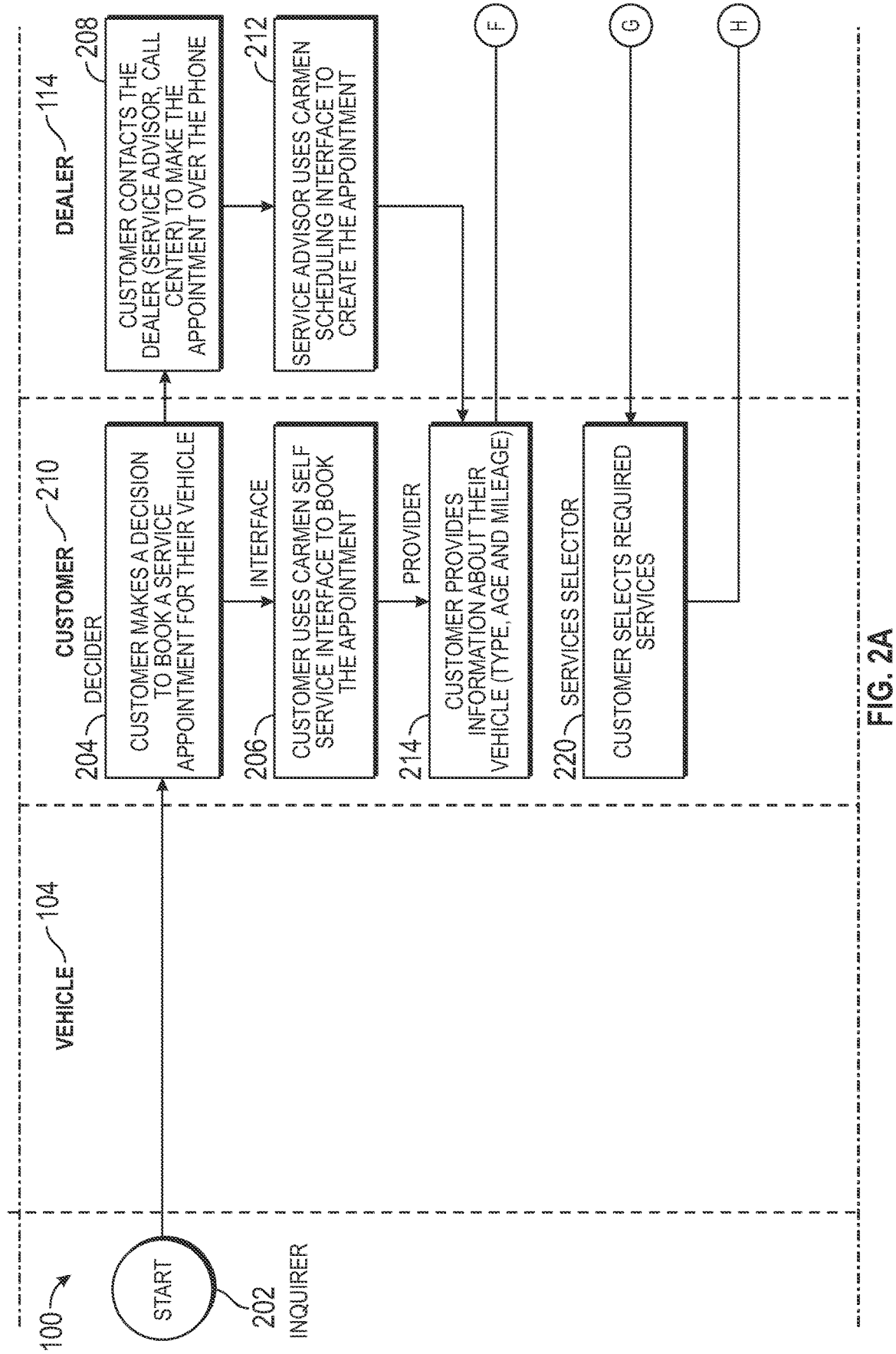
FIGS. 2A-2H is a set of schematics and associated flow charts that represents the Customer Initiation Regarding Utilization of SSDD(s).

The Carmen Services Teams [120] are assembled and available to both the permission customer [110] and the inquiry customer [210] (as shown and described in FIG. 2A). The service teams are a combination of technicians and service advisors (both customer facing and internal only), based on their capabilities and function (e.g., type of maintenance), physical location in the workshop (e.g., "quick lane") and/or skill set (e.g., electrical/mechanical/engine/computer repair/interior body, exterior body, etc) [121]. A daily capacity time limit [124] for each team, based on historical performance data, is provided to the user [101], as a feature whether or not the user is a permission customer [110] or an inquiry customer [210].

The Carmen Scheduling Device [126] provides an itemized menu to the permission customer [110] and the inquiry customer [210] (as described in FIG. 2A) and more specifically also defines four-time values [128]:

1. Allocated time—defined by the vehicle manufacturer. This is the only time that will be presented to the customer.
2. Actual Time—as calculated based on historical performance (average amount of time to perform the service operation by a technician of a certain skill level/skill set)
3. Projected Additional Service Recommendations (ASR)—upsell potentials provided to the dealership, service team, and/or service technician.
4. Transfer Time—the time between when the technician completes the work on one vehicle and starts working on another vehicle As shown in FIG. 2B, once the permission customer [110] selects with a selector [116] the dealership [114] where they would like to have their connected vehicle [104] serviced, the intelligent engine of the Carmen Service Menus Provider [118] recognizes the vehicle VIN and "fault" code and matches [216] them against the selected dealer op-codes (operation codes specific to each service operation) and teams of certain skill level/skill set required to perform the identified service(s).

Process #2: Inquiry Customer Tool

Figure 2B:
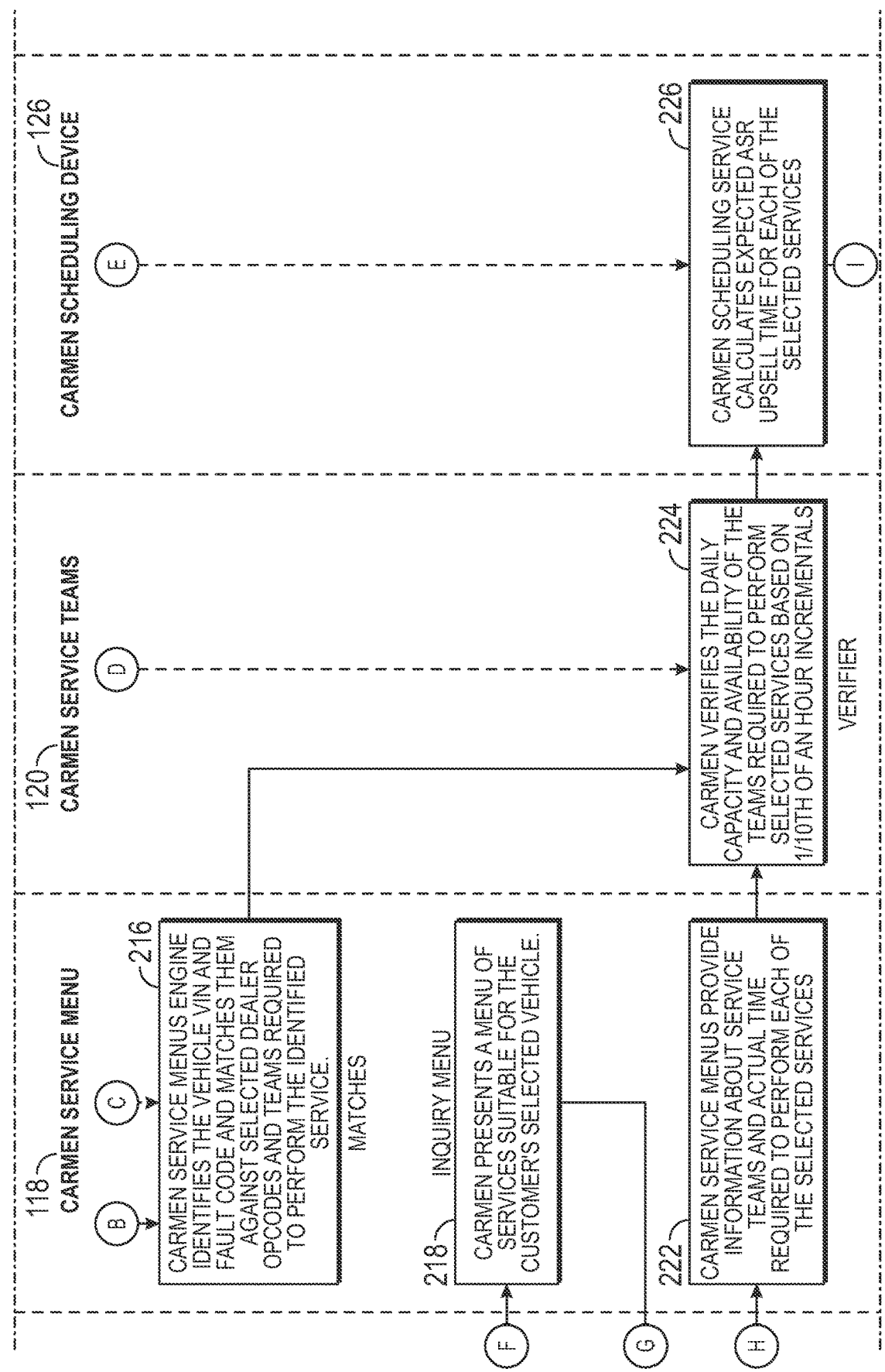

For FIGS. 2A and 2B, a user [101] utilizes an inquirer [202] to provide a desired service of the vehicle via an as an inquiry customer [210] user interface, usually the customer's mobile device. The inquiry customer interface [210] utilizes a decider [204] that is also a scheduler that determines what and when a service appointment for the customer's vehicle can be provided. The inquiry customer interface [210] can:

1. Utilize the Carmen Self-Service Interface [206] to schedule an appointment, or
2. Contact the dealer [208] (including the service advisor with or without a call center) so that a service appointment can be completed over the phone.

When contacting the dealer via a contactor, the service advisor utilizes a Carmen Scheduling Interface [212] to create the appointment.

In this case, because the inquiry customer [210] does not have subscribed permission to utilize the (for automobiles the) Carmen SSDD [100], automatic transmission of vehicle data does not occur, and the inquiry customer [210] must provide, via an unsubscribed permission provider [214] information about their vehicle (type, age, and mileage). Once the vehicle information is provided, the intelligent engine of the Carmen Services Menu Provider [118] provides via AI, a specially selected inquiry menu [218] of services suitable for the inquiry customer's [210] selected unsubscribed, un-connected vehicle [104]. The inquiry customer [210] selects the required services via a required services selector [220] and the intelligent engine of the Carmen Services Menu Provider [118] provides acquired information regarding proper service teams and an actual time required to perform each of the selected services [222] via the required services selector [220].

Process #1 & #2 Merge: The Permission Customer Tool with Inquiry Customer Tool

Once the permission customer [110] is informed of the required services and service locations and the inquiry customer [210] has selected the desired services and service teams, the process controlling the permission customer tool with the inquiry customer tool for the permission customer [110] and the inquiry customer [210] are the same (FIG. 2B). Carmen SSDD [100] verifies the daily capacity and availability via a verifier [224] of the Carmen services teams [120] required to perform the selected services based on hourly increments (normally $\frac{1}{10}^{th}$ of an hour). Carmen SSDD [100] calculates the expected automated service request (ASR) upsell time [226] for each of the selected services. In FIG. 2D, the Carmen SSDD [100] is shown via a highest potential selector [228] an ASR upsell time [226] from all the selected services. Here, a first decision tree,

[230] for the selected services requires a Yes [232]/No [234] answer to the question, "Is the same team required for all services?".

If the answer is "yes" [232] instructs the Carmen SSDD [100] to add the expected ASR upsell time to the sum of actual times of all selected services [236]. The Carmen SSDD [100] adds a pre-defined service buffer (time between vehicles) to the total time block per each item [238]. For each of the selected teams (or single team) the Carmen SSDD [100] determines available time slots able to accommodate the calculated time blocks [240].

If the answer is "no" [234] then the Carmen SSDD [100] is required to define the hierarchy of the teams required to perform the selected services [242]. The Carmen SSDD [100] then adds the expected ASR upsell time to the sum of actual times of the services of the team which are ranked the highest in the hierarchy [244]. Carmen SSDD [100] then adds a pre-defined service buffer (time between vehicles) to the total time block per each item [238]. For each of the selected teams (or single team) the Carmen SSDD [100] determines available time slots able to accommodate the calculated time blocks [240].

Figure 2C:
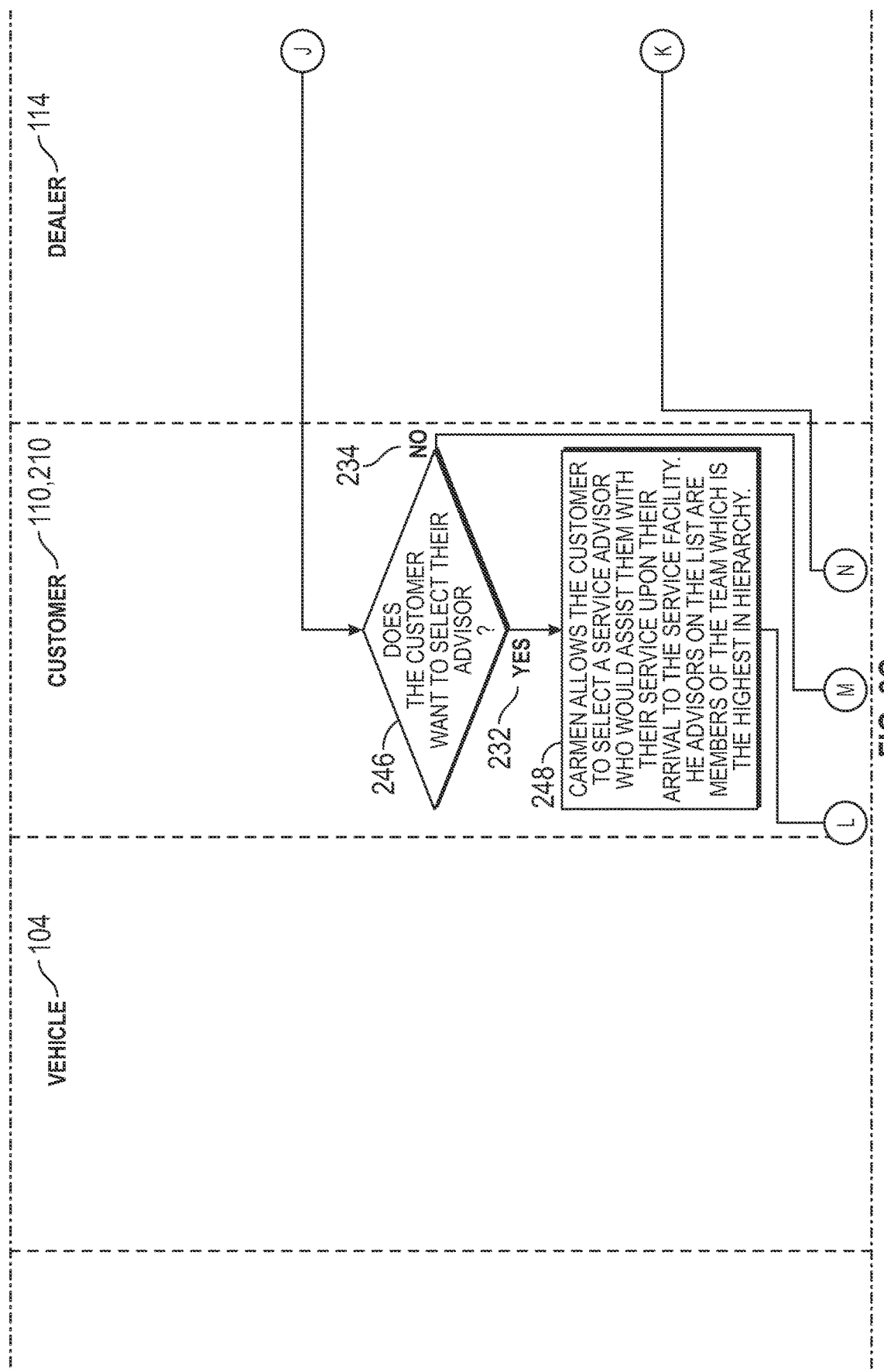
Figure 2D:
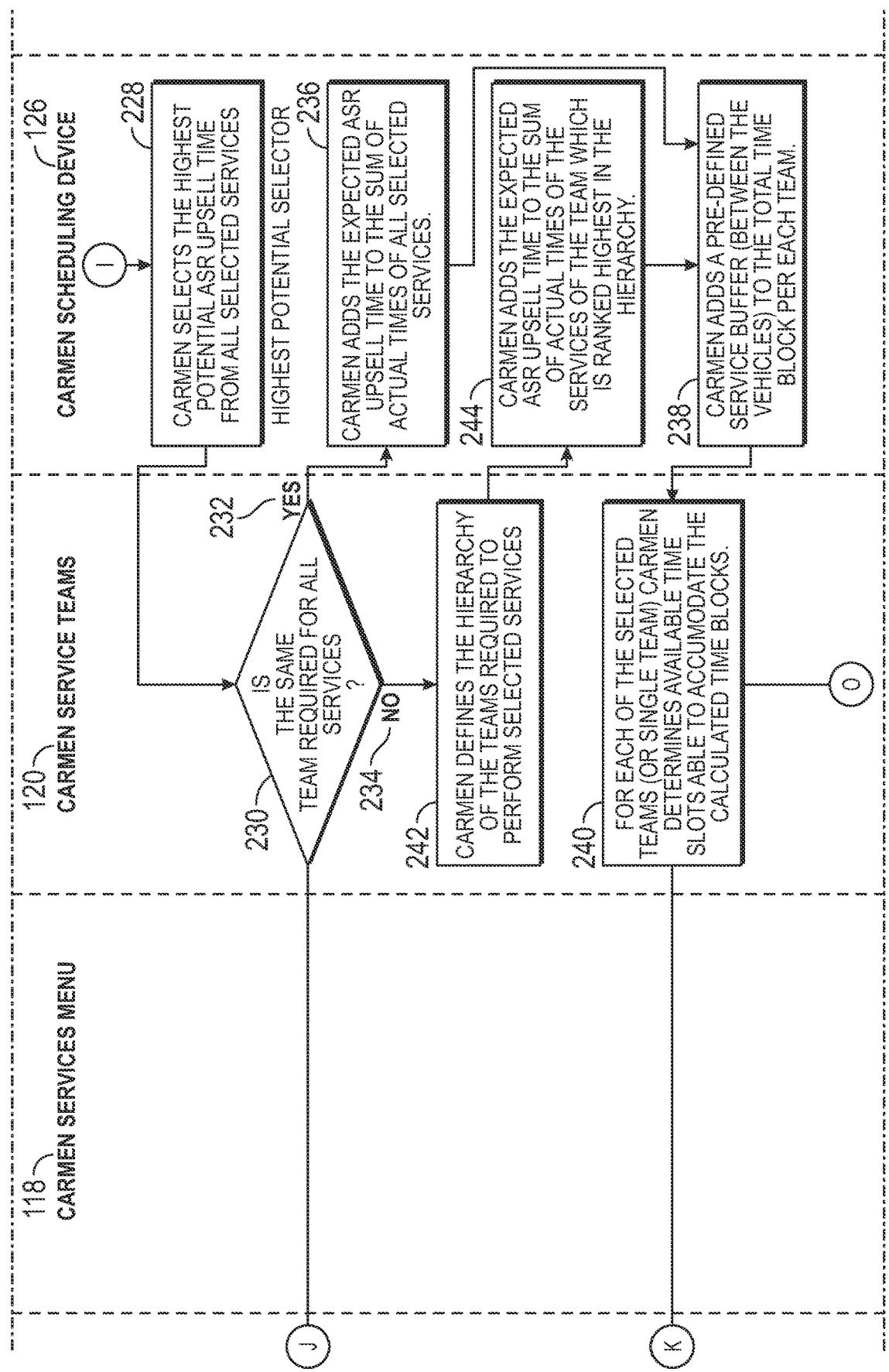
Figure 2E:
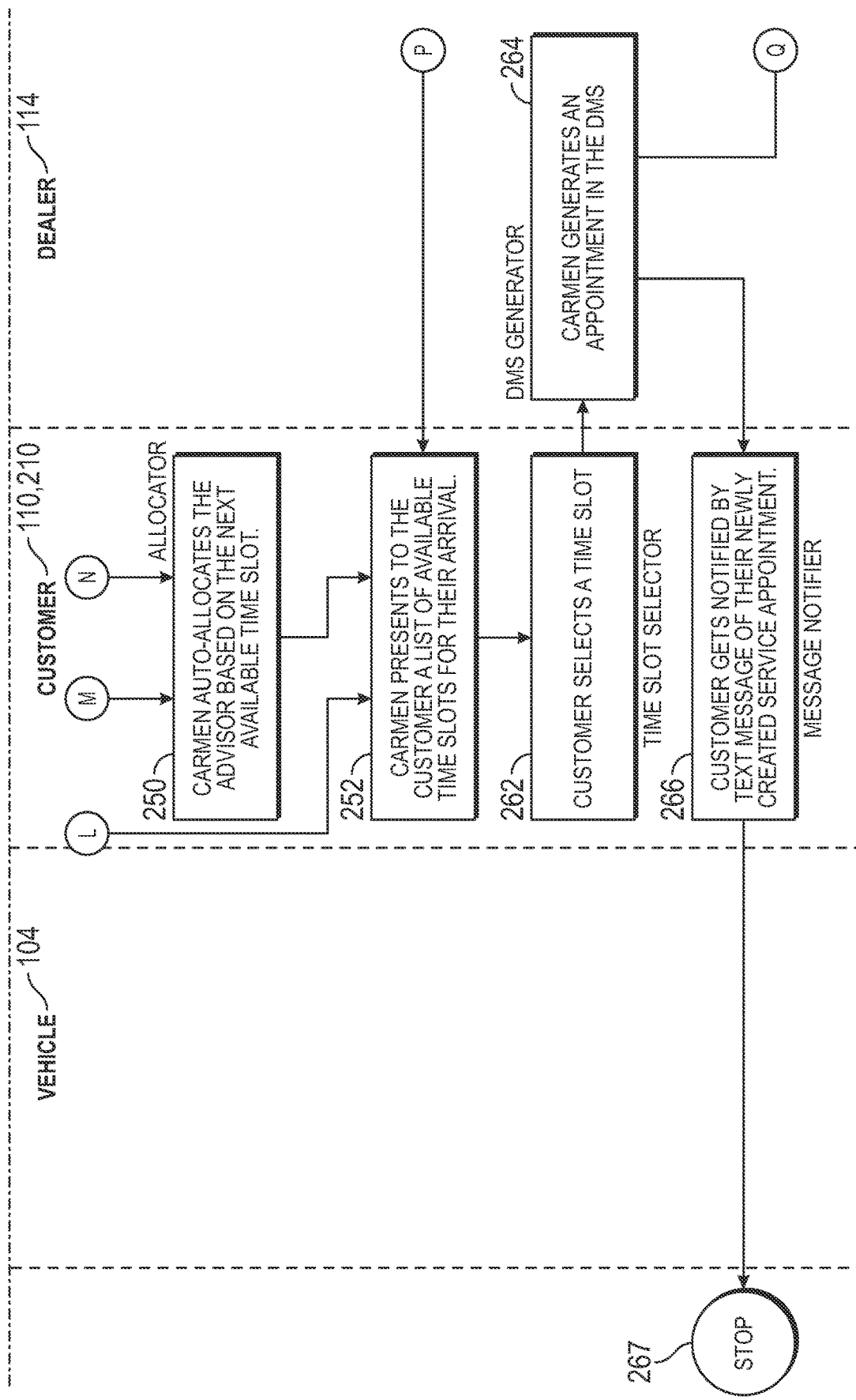

Once the available time slots able to accommodate the calculated time blocks is determined [240], the Carmen SSDD [100] auto-allocates the service advisor based on the next available time slot [250] (FIG. 2E). Carmen SSDD [100] provides the customer [110, 210] a list of available time slots [252] (FIG. 2E).

In FIG. 2C, another decision tree is provided [246] for the selected services that requires a Yes [232]/No [234] answer to the question, "Does the customer want to select their service advisor?". If the answer is "yes" [232], the Carmen SSDD [100] allows the customer to select a service advisor [248] who then assists them with their service upon their arrival to the service facility. The advisors on the list are members of the team that represents the highest order in this specific hierarchy. Carmen SSDD [100] provides the customer [110, 210] a list of available time slots [252] (FIG. 2E). From the list of available time slots [252] the customer [110, 210] selects a time slot [262]. The Carmen SSDD [100] generates an appointment in the dealer management system (DMS) via a DMS generator [264]. The customer [110,210] is then notified via a message notifier [266] by messaging (via voice or data or both voice and data) of their newly created service appointment.

In this case, when the answer is "No" [234], the Carmen SSDD [100] auto-allocates the advisor based on the next available time slot via an allocator [250] (FIG. 2E). Carmen SSDD [100] provides the customer [110, 210] a list of available time slots [252] (FIG. 2E). From the list of available time slots [252] the customer [110, 210] selects a time slot via a time slot selector [262]. The Carmen SSDD [100] generates an appointment in the dealer management system (DMS) via a DMS generator [264]. The customer [110,210] is then notified via a message notifier [266] by messaging (via voice or data or both voice and data) of their newly created service appointment.

Figure 2F:
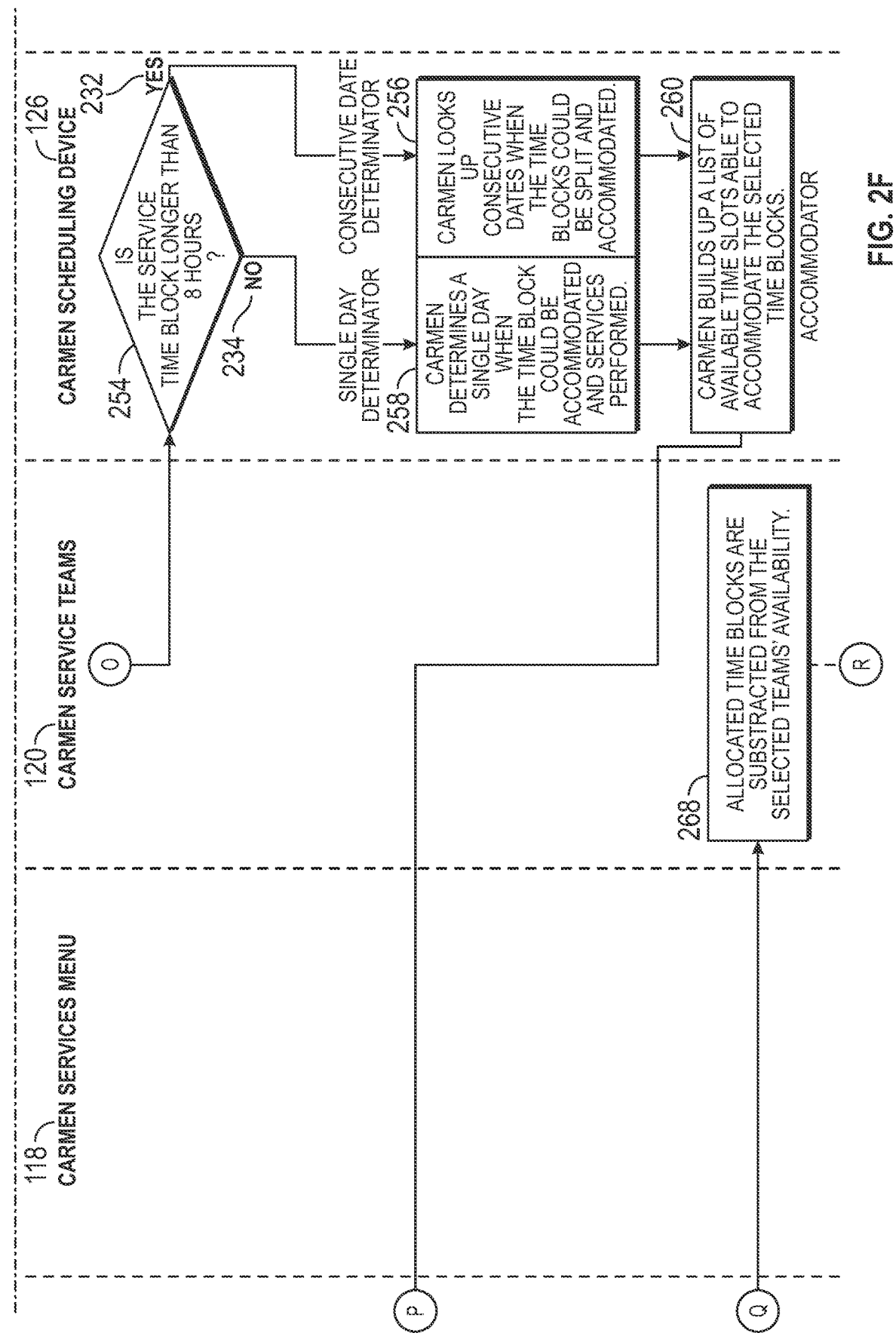
Figure 2G:
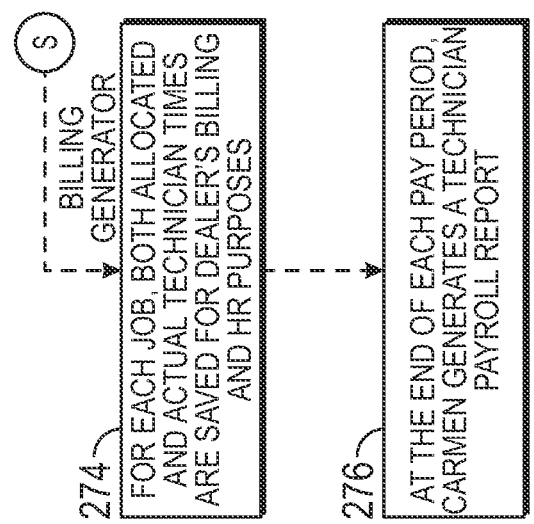

In FIG. 2F, a third decision tree is provided [254] for the selected services that also requires a Yes [232]/No [234] answer to an additional question, "Is the service time block longer than eight (8) hours?". When the answer is "yes" [232], the Carmen SSDD [100] determines looks up consecutive dates when the time blocks could be split and accommodated via a consecutive date determinator [256]. When the answer is "No" [234], the Carmen SSDD [100] determines a single day when the time block could be accommodated, and services performed via a single day determinator [258]. Using the time block results of [256] or [258], the Carmen SSDD [100] builds a list of available time slots able such that the selected time blocks required can be accommodated via an accommodator [260]. Carmen SSDD [100] then provides the customer a list of available time slots for final approval [252] (FIG. 2E).

From the list of available time slots [252] the customer [110, 210] selects a time slot [262]. The Carmen SSDD [100] generates an appointment in the dealer management system (DMS) via the DMS generator [264]. The customer [110,210] is then notified via a message notifier [266] by messaging (via voice or data or both voice and data) of their newly created service appointment. The process for the customer [110,210] is then considered complete [267].

Figure 2H:
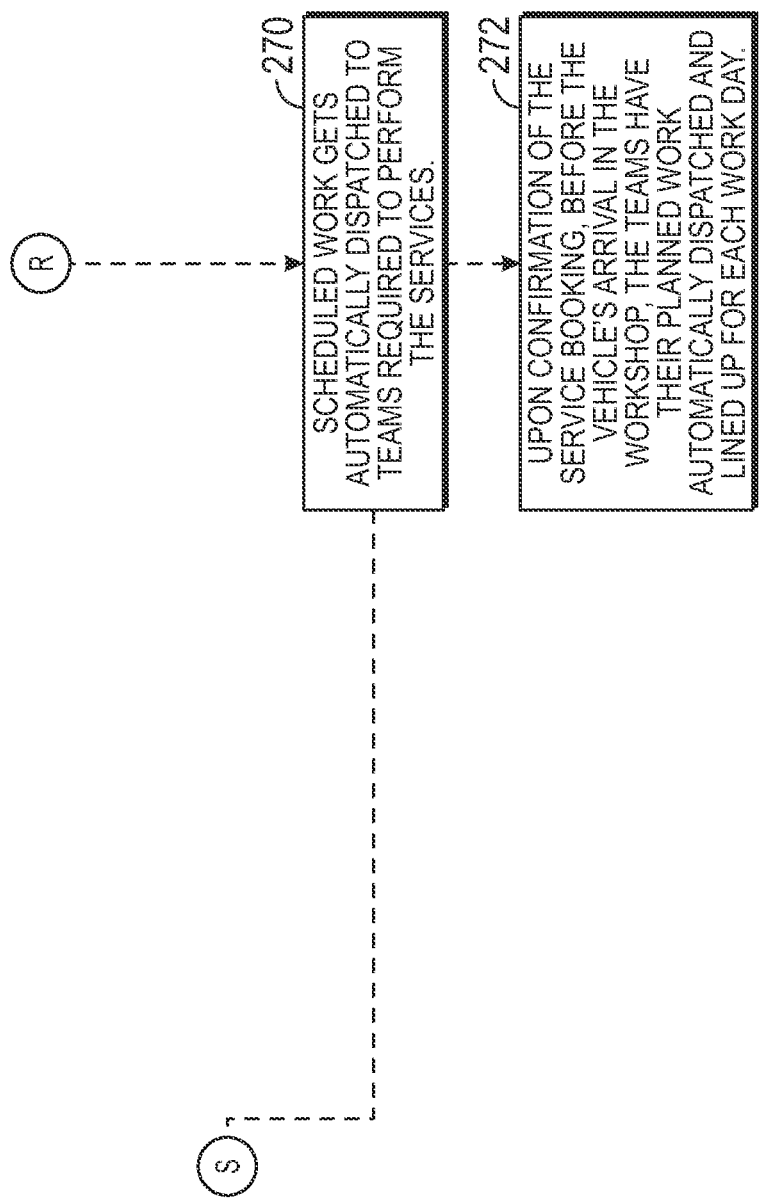

Once the appointment is generated in the DMS by the DMS appointment generator [264], the allocated time blocks are subtracted from the selected teams' availability [268] (FIG. 2F). The scheduled work gets automatically dispatched to teams required to perform the services [270]; therefore, upon confirmation of the service booking, and before the vehicle's arrival in the workshop, the teams have their planned work automatically dispatched and lined up for each workday [272], as shown in FIG. 2H. For each job, both allocated and actual technician times are calculated, documented, and saved for the dealer's billing and human resources (HR) purposes via a billing generator [274]. At the end of each pay period, the Carmen SSDD [100] utilizes the billing generator [274] and its internal AI to provide reports that can include technician payroll data, invoiceable costs data, and pricing data in summarizable reports. [276].

Use of Historical Data for Predictive Analytics for Carmen SSDD

FIG. 3 provides the use of historical data [300] for predictive analysis for use by Carmen SSDD. The historical data is provided for cars [310], drivers [320], dealerships [330], and historical repair orders [340], as described in the following steps:

[310]: Historical data about cars which exist in database systems hosted at the Carmen SSDD tool are retrieved.

[320]: Historical data about drivers such as location, age, gender, spending behavior, temporal and spatial aspects of service visits which exist in database systems hosted at Carmen SSDD devices are retrieved.

[330]: Data that match with data records found at Steps [310] and [320] are used to retrieve specific data attributes from dealership management systems. These data attributes include details about advisers such as qualification, time on job etc.

[340]: Historical data records that match with data items retrieved at Step [330] are used to get SSDD predictive analytics dataset (SSDDPAD) from historical repair order database systems. Historical repair order data includes recommended items, sold items, advisor involved etc. SSDDPAD represents dataset that is used by various predictive analytics modules at Carmen SSDD devices to derive statistical patterns [350] from the data and provide predictive and prescriptive insights for business stakeholders which includes manufacturers, dealers, vehicle owners.

Use of AI and Historical Data for SSDD Operations

Figure 4:
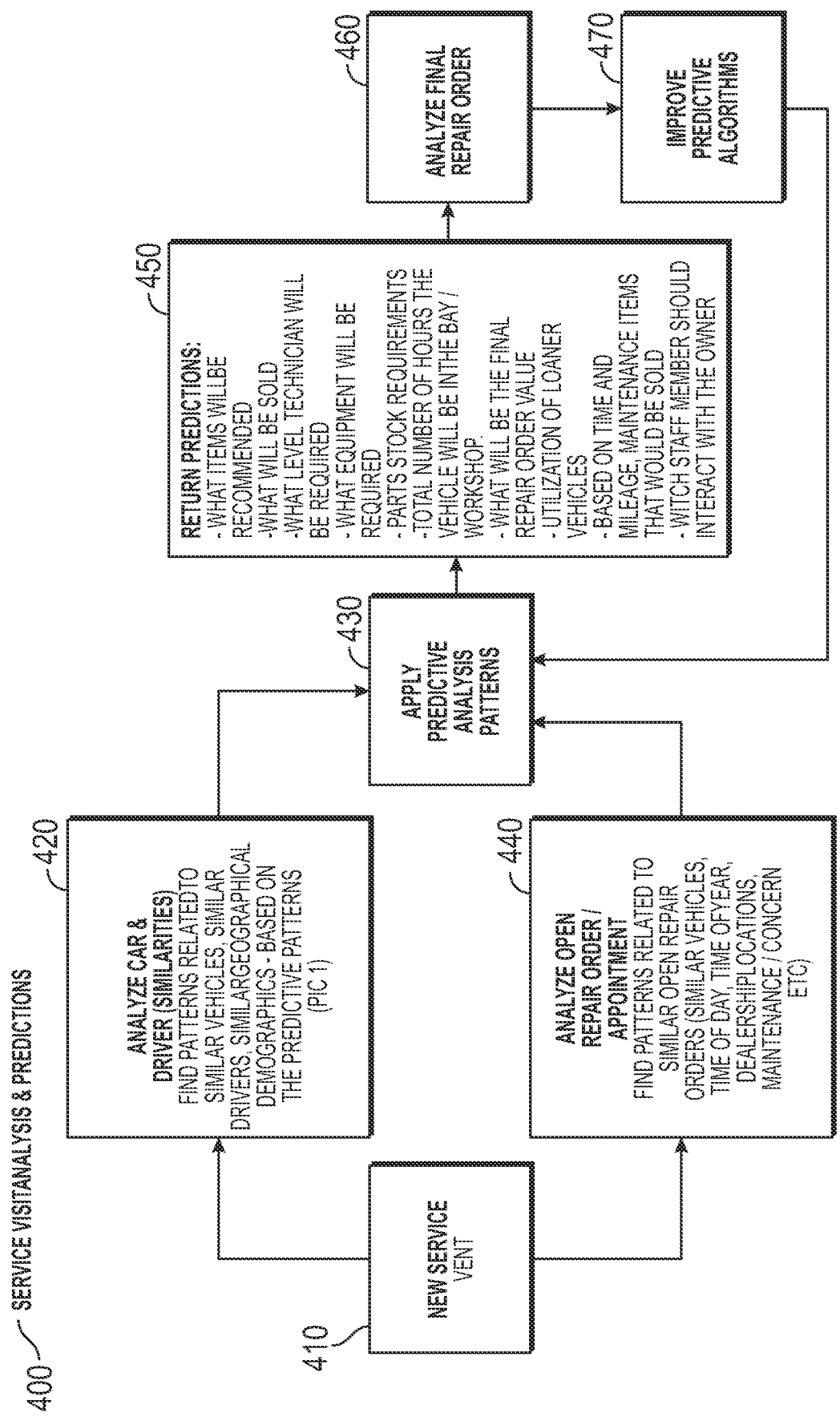
FIG. 4 is a schematic and flow chart that represents the service visit and Predictor capabilities of the SSDD tools.

FIG. 4 includes the use of AI and historical data for Carmen SSDD operations.

[410]: A new vehicle service event is captured by the SSDD tool.

[420]: The Carmen SSDD tool finds similar vehicles, similar drivers etc. based on data attributes related to the vehicle that is under consideration for a service and historical vehicle and customer data. Simple similarity metrics such as cosine distance are used.

[430]: The Carmen SSDD tool finds open repair orders that are similar to the service request for the vehicle considered at Step [410]. Simple similarity metrics such as cosine distance are used.

[440]: Predictive analytics algorithms are applied to derive insights listed at Step [450].

[450]: The Carmen SSDD tool returns predictions for quantities including items sold, total number of hours spent by a vehicle in a workshop, utilization of loaner vehicles among other quantities listed in FIG. 4.

[460]: Carmen SSDD uses output from Step [420], Step [440] and Step [450] to predict final repair order details.

[470]: The outcome of service operation on the vehicle arrived at Step [410] and predictive outputs derived at Step [460] are used to improve predictive analytics algorithms.

Analysis for SSDD Predictions

FIG. 5 provides shop business intelligence predictions [500].

[510]: A query is made by a business stakeholder of a dealership to derive predictive and prescriptive analytics-based insights.

[520]: The Carmen SSDD tool analyses dealership data to find similar dealerships based on criteria such as brands, locations, business hours etc.

[530]: The Carmen SSDD tool employs predictive analytics algorithms to derive patterns from the data retrieved at Step [520].

[540]: Predictive and prescriptive insights are presented to the business user in various formats so that operational efficiency can be improved by the dealership.

Description of the Service Scheduling and Dispatch Device (SSDD) Understand AI Module The SSDD's Understand AI module interacts with a customer to determine (in many cases by interpreting) problems that the customer's vehicle is facing and conclude with a set of potential service operations needed to resolve the problems with the vehicle. Specifically, the SSDD's Understand AI module involves computing processes to analyze concerns that a customer expresses in their natural language via text, voice etc. regarding his/her vehicle. Once the SSDD's Understand AI module determines the vehicle's problems, known as Concern Types, the module via AI and software analytics with, in many cases, hardware interfaces, presents the customer with a set of interactive questions which are further used to conclude how to address specific vehicle problems or Symptoms. These symptoms have corresponding Cases which are descriptive of specific repair operations to be carried out to resolve symptoms regarding the vehicle.

The Service Scheduling and Dispatch Device Understand AI module acts as an artificial bridge between customers who have problems with an owned vehicle and service technicians who can repair a vehicle to resolve its problems. This essentially eliminates the need for most if not all service adviser personnel. Currently, a service adviser can interact with a customer and determine possible Concern types, Symptoms and Cases relevant to a vehicle with various issues and needs and assign service repair tasks to service technicians. The SSDD Understand AI module achieves the important task of handling more than one customer at any given time. This is not possible for human service adviser personnel. This module makes it possible for the SSDD to provide scalability in customer interaction as well as vehicle problem analysis but is just not achievable with human personnel.

In addition, the Service Scheduling and Dispatch Device Understand AI module analyzes text corresponding to the issues described by a vehicle consumer to derive Concern types. The SSDD extracts such data from digital communication channels which can receive and transmit data in formats such as keyboard input, voice etc. Digital voice assistants such as Alexa, Google Assistant etc. are deployed/interfaced with these digital communication channels. These channels can be securitized and encrypted by methods described in U.S. Pat. Nos. 10,154,015, 10,154,016, 10,154,021, 10,154,031, 10,158,613, 10,171,435, and 10,171,444, the full contents embodiments and claims of which are hereby incorporated by reference in their entirety. The SSDD Service Scheduling and Dispatch Device Understand AI module(s) utilize textual topic analysis models such as Latent Dirichlet Allocation (LDA), Explicit Semantic Analysis (ESA), and Named Entity Recognition (NER) tools such as Stanford NER and structured information extraction services such as DBpedia Spotlight to derive Concern types from the free text corresponding to one or more descriptions of at least one vehicle's problems. Furthermore, sentiment analysis of the free text is performed to infer the sentiments of the consumer such as "frustrated", "little concerned", "angry" etc. This is achieved through pre-processing steps such as stop-word removal, tokenization etc. and then applying lexicon based supervised classifiers such as Support Vector Machine (SVM). Advanced analytics are applied in cases where the accuracy of classifiers is found to be below a predetermined threshold score of acceptance. This score is derived from the evaluation of sentiment label accuracies achieved when derived emotion labels are compared to the ground truth initially generated by human evaluators. The predetermined threshold will change according to the advanced training and subsequent knowledge that the SC can achieve over time. Advanced analytic metric SSDD such as Jensen-Shannon divergence, Entropy scores and clustering techniques such as K nearest neighbor (KNN)-, as well as Infinite Mixture Models can be applied to achieve similarity and/or distance scores that are obtained via standard emotion labels and preprocessed text.

Once the Concern types are identified by the Service Scheduling and Dispatch Device Understand AI module, the SSDD device(s) will retrieve the questions that correspond to the Concern types from one or more Symptoms databases. These questions have multiple sources and options for providing the customer/consumer with answers. Depending on the data derived from new and existing databases the SSDD will then retrieve the answers corresponding to these questions from the one or more Symptoms databases. These questions and answers can be presented as N-array tree data structures that represents networked data structures where questions can be represented as nodes and edges (which define a tree data structure) to ascertain answers. Typical questions include "What is the color of fluid leaking from the engine?", "When do you receive a rattling sound on the windscreen?" etc. Each combination of Concern types will have its own N-array tree for Symptoms. The leaf nodes of the tree represent various Symptoms obtained in the form of data from the databases. Questions can be presented to a consumer by digital communication channels such as digital voice assistant e.g., Alexa, Google assistant etc., as well as touch screen-based kiosks among the numerous software/hardware I/O devices available. Answers (responses) provided by the customer consumer are returned to SC devices and via AI and database capabilities, the responses/answers are matched with the initial queries/questions to achieve an ever-evolving dataset that is self-improving as it receives additional data. The data must be parsed to achieve the proper use of the learning algorithms developed with various forms of machine language (ML) techniques.

This question and answer (query and response) session(s) between digital communication channels and the customer/consumer results in an in-depth first traversal of a N-array tree. Reaching the leaf node of the tree stops the traversal of the tree, as a leaf node represents a Symptom. Consumers/customers are presented with an option to start the question-answer session(s) from the beginning by utilizing digital communication channels that includes transmitters and receivers and/or transceivers. This allows the user to input multiple Symptoms data during a given interaction session with a digital communication channel. Once the SSDD devices interprets one or more symptoms relevant to a customer's vehicle, it queries the Cases database and suggests a list of repairs and/or accessories for approval by the consumer/customer via the digital channel preferred by the customer. Note that an N-array tree structure corresponding to a Symptom in the Symptom database is periodically updated based on feedback from manufacturers, expert service technicians, service advisers and other service and/or non-service personnel that can contribute to the data within the various Symptom and Cases databases. As stated earlier, the feedback data obtained from these professionals and manufacturers is also used to update Symptoms and Cases databases.

Description of the Service Recommender AI Module

Here, the SSDD device retrieve a set of services and/or accessories for at least two possibilities. If a consumer selects maintenance for a vehicle, a list is provided with of all the services and accessories associated with the specific vehicle which is retrieved from the DMS based on vehicle information supplied by the customer/consumer. If a customer/consumer selects services for a vehicle, the SSDD will determine Concern issues from data existing or being added/removed from the Concern, Symptom, and Cases database(s) by employing the (for automobiles) the Carmen Service Scheduling and Dispatch Device Understand AI module. Once relevant Cases are understood and provided, the SSDD device(s) will retrieve a list of all services and accessories related to the cases identified. The SSDD device(s) exist to provide an increase in revenue of dealerships and other vehicle dependent businesses by providing the opportunity to upsell services and/or accessories to consumers. The SSDD recommends (with a recommender) to the customer/consumer with an assortment of upsell services and/or accessories. The goal for the dealership/business is to obtain the highest expected revenue. Expected upsell revenue is a product of probability that an upsell item will be purchased by a given customer and the cost of the upsell item is normally much less than the price passed onto the customer. In order to accurately determine the upsell probability of an item based upon a customer profile, the SSDD utilizes a combination of content-based and content-agnostic systems, which are two broad classes of recommender schemes.

Content-based systems analyze content of products, for example textual description, and historical transactions, as well as customer profile similarities with other customers to predict the probability of purchase by a user/consumer/customer. Simple text processing techniques include stemming and tokenization which are used for analyzing textual descriptions of products. Bayesian networks that can respond to conditional probabilities for any nodes are deployed to derive the upsell probabilities. Historical upsell and buying data which is stored, retrieved and analyzed as needed from appropriate databases or via streaming data transceived to and from the SSDD during the course of business transactions are used to train the network nodes of the Bayesian network. Customer profile similarities are derived using distance metrics such as cosine distance. The SSDD(s) implement various versions of affinity analyses that include for example market basket analysis in situations where extensive data is not available for a specific customer. The SSDDs do not consider the textual content of items/vehicles/customers with respect to the deployment of content-agnostic methods. Instead the SSDD considers the values of data attributes for historical data and values of data attributes for the most current data that is obtained and represents the consumer/customer's trends and consumer's vehicle needs to derive upsell probabilities.

The SSDD utilize a wide selection of content which is provided to Carmen Service Scheduling and Dispatch Device recommender AI module and includes at least the following data:

a. Vehicle year/make/model
b. Previous vehicle service history
c. Vehicle owner's previous purchase habits
d. Similar vehicles historical repair orders information
e. Time of year (e.g. offer winter tires in December)
f. Current weather (e.g. offer wiper blades when wet weather exists or is forecast)
g. Dealer preference settings (e.g. mandatory upsell items).

This data and associated information are combined with behavioral results based on historical customer purchase decisions that enable the SSDD Recommender AI module to provide accurate upsell probabilities and in turn expected upsell revenue for various combinations of upsell recommendations by utilizing computer(s) and/or network systems that analyze data and provide useful results based on the data analysis. The upsell item combinations that result in maximum upsell revenue are presented to a customer/consumer via digital communication channels for data transceived to and from (transmitted and received) the SSDDs.

Description of the Service Scheduling and Dispatch Device (SSDD) Predictor AI Module The Service Scheduling and Dispatch Device Predictor AI module is a software module that operates together with and can reside within or external to the SSDD(s) that is responsible for delivering descriptive, predictive and prescriptive business insights for vehicle dealerships, associated vehicle businesses and any of the stakeholders. The Service Scheduling and Dispatch Device Predictor AI module provides unique data type that utilizes the ability to provide accurate predictions and unique business insights for these vehicle businesses. The Service Scheduling and Dispatch Device Predictor AI module is an improvement over the state-of-the-art predictive analytic SSDD solutions available today. The Service Scheduling and Dispatch Device Predictor AI module uses not only the data stored in SSDD DMS and related databases with data derived from dealerships and associated businesses but also generates data using digital communication channels that are either housed within SC device(s) or from external data and databases. This unique and constantly updated data includes a consumer's description of a vehicle's problem, consumer's emotion(s), Concern types detected by Service Scheduling and Dispatch Device Understand AI module, etc. This continuously improving data (in terms of useful data capture) and data analysis is based upon at least Consumer interaction data and Vehicle interaction data. The Vehicle interaction data includes customer's vehicle data captured by sensors that utilize digital communication channels including vibration sensors in addition to additional data captured from vehicles.

Current predictive analytic solutions do not have access to the consumer interaction data and vehicle interaction data. Current predictive analytic solutions use only transactional data that are available in SSDD DMS systems and related databases. The unique consumer interaction data and vehicle interaction data available on SSDDs are transformed by Service Scheduling and Dispatch Device Predictor AI modules using techniques that include log transformation, and binarizing categorical predictor variables. This allows the Service Scheduling and Dispatch Device Predictor AI module to generate business analytics including at least those listed below.

A) Real-time service visit outcomes and customer behavior predictions based on the VIN number of a vehicle which either enters the workshop/garage or is scheduled for service). The list below is not intended to be all inclusive but at least a portion of the business analytic capabilities available by utilizing the SSDD and SSDD Predictor module(s)—there may be more than one Module;
1. Predict what items will be recommended
2. Predict what will be sold (parts and labor\Predictions based on time and mileage, maintenance items that would be sold
3. Predict what will be the final repair order value
4. Predict the total number of hours the vehicle will be in the bay/workshop.
5. Predict what level technician will be required
6. Predict what equipment will be required for repairs/maintenance/upgrades
7. Predict parts stock requirements
8. Predict and optimize the utilization of loaner vehicles
9. Predict which staff member should interact with the owner B) Business intelligence predictive reports (Dealership/associated business analytics dashboard)
1. Predict future shop revenues
2. Predict future shop efficiency
3. Predict future staffing needs
4. Predict future bay needs
5. Define and predict most efficient process models
6. Predict future average and broken down by vehicle make/model/year repair order values
7. Predict future parts inventory requirements
8. Predict the number of service vehicles to be traded in and upgraded
9. Predict most appropriate time to present the customer with an offer for trade-in The data input required to create a predictive analysis model includes but not limited to the following:
a. Historical repair order information (booked service items, recommended items, sold items) from
 i. Particular store
 ii. Region
 iii. Vehicle brand and model
b. Historical vehicle owner's spending patterns
 i. Type of recommendations previously purchased
 ii. Percentage of recommendations previously purchased
 iii. Dollar amount spent per visit
 iv. Service visit frequency
c. Time of day when the vehicle arrived at the store
d. Technician's number of recommendations
e. Technician's value of recommendations
f. Technician's recommendation rate based on year, make, model and mileage
g. Advisor close rate on recommendations percentage
h. Advisor close rate on customer pay recommendations
i. Advisor recommendation rate based on year, make, model and mileage
j. Vehicle make/model/year/mileage
k. Driver's age group/gender/location
l. Time of year/month/weather
m. Dealership location
n. Dealership business hours
o. Number of shop bays
p. Number of shop technicians
q. Number of advisors
r. Repair order/hours sold and number of technicians ratio
s. Repair order/hours sold and number of bays ratio Ad-Hoc Predictive Analysis Process: Repair Recommendations with Customer Decision Predictions The Service Scheduling and Dispatch Device Predictor AI module utilizes a combination of content-based analysis of historical repair orders together with a content-agnostic analysis of a combination of the above-mentioned data input factors. The Service Scheduling and Dispatch Device Predictor AI module performs content-based analysis of the content of historical repair orders, their textual description of line items recommended and sold, and based on historical transaction outcomes, predicts the probability of vehicle owner's purchase behaviors. Historical transaction data, consumer interaction data, vehicle interaction data related to a vehicle are used to derive features for content-agnostic predictive algorithms. The underlying concept is that similar customers, driving similar vehicles, in similar locations, etc., normally approve similar recommendations. Affinity analysis such as market basket analyses are utilized by the Service Scheduling and Dispatch Device Recommender AI module to recommend a group of services and/or accessories available for upsell. The Service Scheduling and Dispatch Device Predictor AI module analyzes the probability or likelihood of upsell items purchased by a customer/consumer.

Input Data

The Service Scheduling and Dispatch Device Prediction AI module uses historical data regarding previous vehicle service visits by consumers/customers. For each such appointment, the SC Prediction AI module uses data about the vehicle (such as its model, mileage, year of production, history of previous repairs), data about the client (e.g., demographics, ideally historical vehicle spending patterns, state of mind in various settings and at various times) and spatio-temporal data such as date of visit (the time of year might be relevant) and location. The Service Scheduling and Dispatch Device Prediction AI module automatically selects those independent variables or predictors that have greatest predictive power. Techniques such as Lasso regression are used to pick these variables based upon historical data to ensure that maximum predictive accuracy attainable for a given dataset is achieved by SSDD Prediction AI module. Supervised predictive algorithms including SVM (support vector machines), neural networks, random forests, etc. have been implemented and are utilized by the SSDD Predictive AI module.

Additionally, to calculate quantities that are dependent on manufacturer, consumer and the vehicle, SSDD(s) utilizes data from manufacturers and predictive insights provided by Service Scheduling and Dispatch Device Predictive AI module which utilizes Consumer interaction data and vehicle interaction data. For example, insights regarding the total number of hours one or more vehicles remain in a bay/workshop and equipment that will be required for service/ repair depends on data from the manufacturer, driver/customer/consumer/caretaker of a vehicle along with historical data of the vehicle.

The Service Scheduling and Dispatch Device Predictor AI module also provides ad-hoc, real-time predictions for each vehicle service visit as an appointment or repair order is generated. The Carmen Service Scheduling and Dispatch Device Predictor AI module also utilizes machine learning techniques (part of the AI capability) for predicting various business metrics SSDD that are of interest to a dealership, vehicle associated businesses and stakeholders (e.g., type of repair). The Carmen Service Scheduling and Dispatch Device Predictor AI module auto-adjusts its predictive accuracy performance by deploying a series of supervised machine learning algorithms on a test dataset where ground truth (initial data set based on actual data captured) of response variables is known and employs data and data analysis resulting in maximum accuracy for those tasked with the need for business analytics.

It is to be understood that the disclosure is not limited to the exact construction illustrated and described above, but that various changes and modifications may be made without departing from the spirit and scope of the invention as defined in the following claims. For example, the present disclosure also includes sending an electronic message to the customer to remind them of an upcoming servicing appointment that the customer has made or provide a servicing reminder at a particular time interval (e.g., when the vehicle has approximately reached 30,000 miles and it is time for a 30,000-mile servicing checkup).

Figure 6:
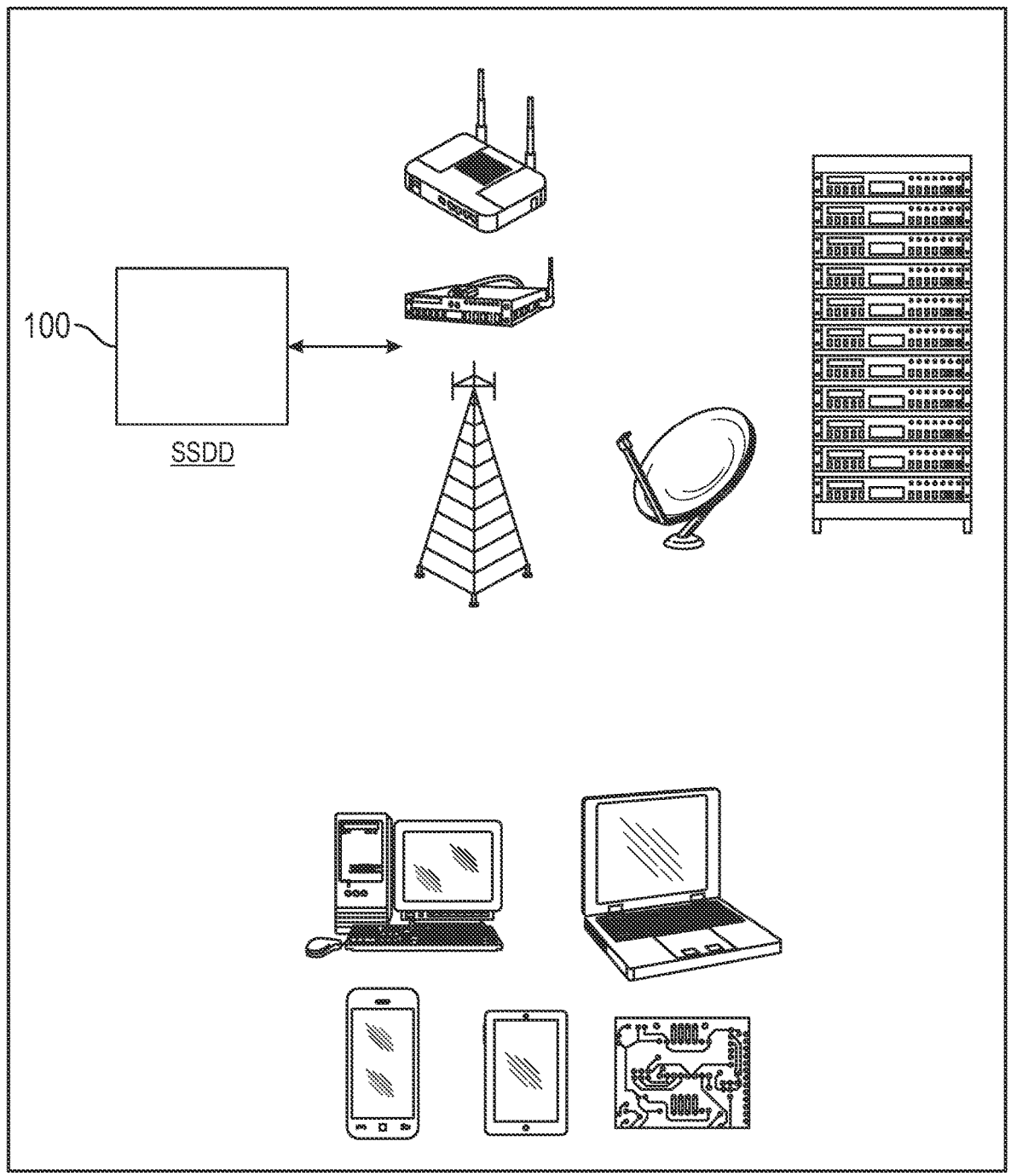
FIG. 6 is a schematic depicting the various types of accessories used to enable the SSDDs of the present disclosure.

FIG. 6 is a schematic diagram that illustrates devices utilized by SSDD. More specifically, FIG. 6 further illustrates and demonstrates actual and various devices using exploded view callouts from that depicted in the schematic diagram shown as shown and described in FIGS. 1A-2H. Devices can also represent DASA database(s) as well as user devices and/or access devices including desktop or stand-alone computer terminals replete with hard drives, laptop computers, cellular or smart telephones, computer tablets such as the iPad®, computer mainframes, and even printed circuit boards or integrated circuits (ICs). Further, elaborating on the virtual user devices as described above, these can be created and are shown as real output device(s). It remains important to understand that these real/physical devices can be used to create virtual user devices.

We claim:

1. One or more access and user devices comprising:
at least one computer processing unit (CPU) with computational capabilities that is connected to and controls a computer memory via an address bus and a data bus where said address bus accesses a designated range of computer memories and range of memory bits and said data bus provides a flow of transmission(s) of data into and out of said CPU and computer memory; so that one or more computer-based vehicle service scheduling and dispatch devices (SSDD)s are operational in connection with or separately from said access and user devices, said SSDD devices comprising; an ability to communicate with a vehicle owner, obtain a description of an owner's concern regarding a vehicle, assess potential mechanical, electrical, optical, and data communication items that might exist for each vehicle, determine, schedule, individualize, and match each detail of a vehicle visit to any vehicle associated business so that when said vehicle enters a workshop said vehicle associated business is prepared to act on items that require attention prior to entrance to said workshop, wherein said SSDDs are employed to provide analysis that includes prediction and monitorization of services and associated costs required for each vehicle and fleet of vehicles or each vehicle or fleet of vehicles on a per vehicle basis and that also includes provision of a determined time increment required for completion of said services wherein said SSDDs includes one or more Carmen Service Scheduling and Dispatch Device (CSSDD) Predictor AI module(s) that is a software module that exists within automobiles that operates together with and can reside within or external to said SSDD device(s) and that is responsible for provision of descriptive, predictive, and prescriptive business data for vehicle dealerships, associated vehicle businesses, and any stakeholders of said businesses, and wherein said Carmen Service Scheduling and Dispatch Device Predictor AI module provides data that utilizes data stored in Dealership Management Systems DMS and related databases with data derived from dealerships and vehicle associated businesses and generates data using digital communication channels either housed within said SSDD device(s) or data derived from external data and databases, wherein said SSDDs provide information in a form of data via one or more data streams and act to control one or more output devices, wherein said output devices are computing devices, wherein databases store data and configure bi-directional securitized and/or encrypted transmission of data to and from multiple SSDDs, wherein said user devices, said access devices, and said SSDDs are computing devices, and wherein one or more user, access, and SSDDs store and provide at least partial copies of portions of a master database, and wherein said master database can also include partial databases and each of said databases are linked and communicate with each other and wherein said user, access and/or SSDDs devices include one or more logging and monitoring databases that include statistical and numerical calculations utilizing said data and said transmission of data and wherein said databases are protected via securitization and/or encryption and are dynamically changing databases that can accumulate and sort data as needed to provide artificial intelligence (AI) to said SSDDs.

2. The one or more access and user devices of claim 1, wherein said one or more SSDD devices authenticate using a first set of computing operations, and validate using a second set of computing operations, and wherein a third set of computing operations controls access for a specified set of users of said SSDDs and wherein data associated with said operations is securitized or encrypted or securitized and encrypted.

3. The one or more access and user devices of claim 1, wherein said SSDDs provide information in data format that optimizes performance and profitability for said vehicle associated business and wherein said data is accessible in order that said data is produced, analyzed, and interpreted and is optionally contained within a report that summarizes interpretation of said data and wherein said vehicle associated business is a dealership for any vehicle including but not limited to boast, ships, airplanes, rockets, missiles, trains, and electrically driven vehicles.

4. The one or more access and user devices of claim 1, wherein said vehicle abruptly enters a dealership's workshop in an unscheduled manner or wherein said vehicle is scheduled for future service at said dealership's workshop.

5. The one or more access and user devices of claim 1, wherein two separate customer types exist as either a subscription customer or an inquiry customer, wherein a subscription customer has subscribed permission to utilize a Carmen SSDD for connected automobiles such that automatic transmission of vehicle data and provider data includes vehicle type, age, and mileage that is automatically accessed so that an intelligent engine of a Carmen Services Menu Provider provides, via artificial intelligence, a specially selected inquiry menu of services and vehicular analysis so that said subscription customer is provided seamless service in that said seamless service requires a minimum or none of a vehicle owner's input and wherein said inquiry customer must at a minimum provide data and information to said SSDDs to determine service teams and an actual time required to perform each of necessary and/or selected services via a required services selector.

6. The one or more access and user devices of claim 1, wherein said predictive assessments provide statistical certainty with regard to vehicular needs based upon historical data obtained from each vehicle and wherein said historical data resides in one or more static or dynamic databases that are included within said one or more computer-based SSDDs.

7. The one or more access and user devices of claim 1, wherein said databases are located within at least one of a group consisting of; a stand-alone, laptop, or mobile computer, a client-server, a network of computers that are networked individually or together and access an internet, a cellular phone that is a smart phone, and a cloud computer.

8. The one or more access and user devices of claim 1, wherein said devices access at least one of a group consisting of an internet, intranet, and extranet such that said devices obtain data generated from multiple sources in addition to data obtained from a single or multiple vehicle related businesses and/or dealerships.

9. The one or more access and user devices of claim 1, wherein data that contains costs, profitability, and associated vehicle services is provided on a per owner basis for individual or fleets of vehicles to vehicle related businesses and dealerships.

10. The one or more access and user devices of claim 1, wherein prediction of items required to service said vehicles are selected from at least one of a group consisting of; non-essential items that will be recommended for/while service is performed for said vehicles during servicing, a level of skill of one or more technicians that will be required, essential equipment required, essential and non-essential parts stock requirements, a total number of hours said vehicle(s) will reside in a vehicle bay/workshop of said dealership, a final repair order value that includes a cost to a consumer, and prediction and optimization of utilization and need of and for loaner vehicles, wherein said prediction is based on data attributes including time and mileage, time on roadways, streets, and highways, as well as customer spending habits, number of vehicles owned and maintenance items that will be sold so that how and which one or more staff members of said vehicle related business and/or dealership should interact with an owner of said vehicle.

11. The one or more access and user devices of claim 1, wherein use of data from databases created or obtained using said SSDDs provides business intelligence in a form of predictive reports that at least predict and can also provide plots with said reports that provide details from at least one of a group consisting of; current/future shop revenues, current/future shop efficiencies, current/future staffing needs, current/future bay needs, current/future averages regarding all vehicle makes/models/years and associated repair order values, current/future parts inventory requirements, a number of service vehicles to be traded in and upgraded, and an appropriate time to present customers with an offer for trade-in that is dependent on predictions obtained from said SSDDs.

12. The one or more access and user devices of claim 1, wherein said devices are virtual devices and wherein said one or more SSD devices are real and/or physical devices.

13. The one or more access and user devices of claim 1, wherein said devices are employed to provide at least one of a group consisting of service, repairs, maintenance, and predictive analysis for autonomous or driverless or autonomous and driverless vehicles on a per vehicle basis and includes a time required for accomplishment of said services.

14. The one or more access and user devices of claim 1, wherein said one or more devices further comprise one or more service scheduling and dispatch (SSD) access and user systems said SSD access and user systems comprising; an ability to communicate with a vehicle owner, obtain a description of an owner's concern regarding a vehicle, assess potential issues that might exist for each vehicle, and to determine, schedule, and individualize each detail of a vehicle visit to any vehicle associated business that enters a workshop, wherein said SSD systems are employed to provide predictive analysis that includes and predicts or monitors or predicts and monitors services and associated costs required for each vehicle and/or fleet of vehicles on a per vehicle basis and that includes a time required for accomplishment of said services.

15. The one or more access and user devices of claim 14, wherein said SSD provides information in a form of data and act to control one or more outputs devices, wherein said output devices are computing devices, wherein databases store data and configure bi-directional transmission of data to and from multiple SSD systems, wherein said user systems, said access systems, and said SSD systems are computing systems, and wherein one or more user, access, and SSD systems store and provide at least partial copies of portions of a master database, and wherein said master database can also include partial databases and each of said databases are linked and communicate with each other and wherein said user, access and/or SSD systems include one or more logging and monitoring databases that provide statistical and numerical calculations utilizing data that contains said information.

16. The one or more access and user devices of claim 14, wherein said one or more SSD systems authenticate using a first set of computing operations, and validate using a second set of computing operations, and wherein a third set of computing operations controls access for a specified set of users of said SSDD systems and wherein data associated with said operations is securitized or encrypted or securitized and encrypted.

17. The one or more access and user devices of claim 14, wherein one or more transaction secured computer-based automobile dealership Carmen Service Scheduling and Dispatch Device CSSDD predictor systems that provide one or more transactions are secured by one or more access devices or one or more user devices or both one or more access devices and one or more user devices comprising: at least one computer processing unit (CPU) with computational capabilities that is connected to and controls a computer memory via an address bus and a data bus where said address bus accesses a designated range of computer memories and range of memory bits and said data bus provides a flow of transmission(s) into and out of said CPU and computer memory; one or more real or one or more virtual master distributed auto-synchronous array (DASA) databases or both one or more real and/or physical and one or more virtual master distributed auto-synchronous array (DASA) databases located within or external to said access devices and said user devices, where said master (DASA) databases at least store and retrieve data and also include at least two or more partial distributed auto-synchronous array (DASA) databases, wherein said partial DASA databases function in either an independent manner, a collaborative manner or both an independent manner and a collaborative manner, wherein said master and said partial DASA databases analyze and provide information in a form of data and act to control one or more output devices, wherein said output devices are computing devices, wherein said one or more output devices create user devices, and wherein said master and said partial DASA databases configure bi-directional transmission of data to and from multiple partial user devices, to and from multiple partial access devices or to and from both multiple partial user and multiple partial access devices, wherein said user devices and said access devices are computing devices, and wherein one or more partial user and one or more partial access devices store and provide at least partial copies of portions of said master DASA databases, and wherein said master DASA databases, said partial DASA databases or both said partial DASA databases and said master DASA databases are linked and communicate with each other as well as inclusion of one or more logging and monitoring databases that provide statistical and numerical calculations utilizing data, wherein said one or more access devices authenticate using a first set of computing operations, and validate using a second set of computing operations, and wherein a third set of computing operations controls access for a specified set of users.

18. One or more access and user devices comprising: at least one computer processing unit (CPU) with computational capabilities that is connected to and controls a computer memory via an address bus and a data bus where said address bus accesses a designated range of computer memories and range of memory bits and said data bus provides a flow of transmission(s) of data into and out of said CPU and computer memory; so that one or more computer-based vehicle service scheduling and dispatch devices (SSDD)s are operational in connection with or separately from said access and user devices, said SSDD devices comprising; an ability to communicate with a vehicle owner, obtain a description of an owner's concern regarding a vehicle, assess potential mechanical, electrical, optical, and data communication items that might exist for each vehicle, determine, schedule, individualize, and match each detail of a vehicle visit to any vehicle associated business so that when said vehicle enters a workshop said vehicle associated business is prepared to act on items that require attention prior to entrance to said workshop, wherein said SSDDs are employed to provide analysis that includes prediction and monitorization of services and associated costs required for each vehicle and fleet of vehicles or each vehicle or fleet of vehicles on a per vehicle basis and that also includes provision of a determined time increment required for completion of said services wherein said SSDDs includes one or more Carmen Service Scheduling and Dispatch Device (CSSDD) Predictor AI module(s) that is a software module that exists within automobiles that operates together with and can reside within or external to said SSDD device(s) and that is responsible for provision of descriptive, predictive, and prescriptive business data for vehicle dealerships, associated vehicle businesses, and any stakeholders of said businesses, and wherein said Carmen Service Scheduling and Dispatch Device Predictor AI module provides data that utilizes data stored in Dealership Management Systems DMS and related databases with data derived from dealerships and vehicle associated businesses and generates data using digital communication channels either housed within said SSDD device(s) or data derived from external data and databases.

19. The one or more access and user devices of claim 18, wherein said data is continuously updated data that includes a consumer's description of vehicle problems, concern types detected by a Carmen Service Scheduling and Dispatch Device Understand AI module, and consumer's emotion(s) regarding said vehicle wherein said continuously updated data is continuously improving data in that data capture is useful for data analysis of one or more vehicles and said data analysis is based upon at least consumer interaction with vehicle(s) data and direct from vehicle automated interaction data.

20. The one or more access and user devices of claim 19, wherein vehicle interaction data includes customer's vehicle data that is captured by sensors that utilize data sent through digital communication channels including vibration sensors in addition to additional data captured directly from informational data that is contained within vehicles.

21. The one or more access and user devices of claim 20, wherein unique consumer interaction data and vehicle interaction data available on SSDDs are transformed by said CSSDD Predictor AI module using techniques that include log transformation and binarizing categorical predictor variables in order to allow said CSSDD Predictor AI module to generate business analytics for said vehicle associated businesses, said business analytics selected from at least one or more of a group consisting of a dealership, a customer/consumer, vehicle repair and maintenance records, and wherein said vehicles include at least one or more of a group consisting of automobiles, trucks, motorcycles, snowmobiles, above and below water transportation craft, aircraft, and spacecraft and wherein said group can also be a fleet of said vehicles.

* * * * *